(12) United States Patent
Bouzguarrou et al.

(10) Patent No.: US 12,411,771 B2
(45) Date of Patent: Sep. 9, 2025

(54) COMBINER CACHE STRUCTURE

(71) Applicant: ARM Limited, Cambridge (GB)

(72) Inventors: Houdhaifa Bouzguarrou, Austin, TX (US); Rami Mohammad Al Sheikh, Morrisville, NC (US); Guillaume Bolbenes, Vallauris (FR)

(73) Assignee: Arm Limited, Cambridge (GB)

( * ) Notice: Subject to any disclaimer, the term of this patent is extended or adjusted under 35 U.S.C. 154(b) by 209 days.

(21) Appl. No.: 18/455,025

(22) Filed: Aug. 24, 2023

(65) Prior Publication Data

US 2025/0068565 A1   Feb. 27, 2025

(51) Int. Cl.
*G06F 9/38* (2018.01)
*G06F 12/0862* (2016.01)

(52) U.S. Cl.
CPC ........ *G06F 12/0862* (2013.01); *G06F 9/3832* (2013.01); *G06F 9/3844* (2013.01); *G06F 9/3848* (2013.01)

(58) Field of Classification Search
CPC ..... G06F 9/3848; G06F 9/3844; G06F 9/3832
See application file for complete search history.

(56) References Cited

U.S. PATENT DOCUMENTS

| | | | |
|---|---|---|---|
| 11,138,014 B2 | 10/2021 | Ishii et al. | |
| 11,379,377 B2 | 7/2022 | Ishii et al. | |
| 2015/0100769 A1* | 4/2015 | Jacobs | G06F 9/3816 712/239 |
| 2021/0232400 A1* | 7/2021 | Ishii | G06F 9/3806 |

OTHER PUBLICATIONS

Ishii Y, "Fused Two-Level Branch Prediction with Ahead Calculation", Journal of Instruction-Level Parallelism, Published May 2007, pp. 1-19.
U.S. Appl. No. 18/455,053, filed Aug. 24, 2023, Bouzguarrou et al.

* cited by examiner

*Primary Examiner* — Jyoti Mehta
*Assistant Examiner* — Minhhanh Tran
(74) *Attorney, Agent, or Firm* — NIXON & VANDERHYE P.C.

(57) ABSTRACT

Prediction circuitry generates a prediction associated with a prediction input address, for controlling a speculative action. Combiner circuitry determines a combined prediction by applying a prediction combination function to a given address and sets of prediction information generated by a plurality of predictors corresponding to the given address. A cache structure comprises combiner cache entries. A given combiner cache entry associated with an address indication indicates items of combined prediction information for an address corresponding to the address indication and different combinations of possible values for the respective sets of prediction information. Lookup circuitry looks up the cache structure based on the prediction input address to identify a selected combiner cache entry, and generates the prediction based on combined prediction information selected from the selected combiner cache entry based on the respective sets of prediction information corresponding to the prediction input address.

20 Claims, 21 Drawing Sheets

COMBINER CACHE STRUCTURE

BACKGROUND

Technical Field

The present technique relates to the field of data processing. More particularly, it relates to generating a prediction for controlling a speculative action by a processor.

Technical Background

Prediction circuitry can be provided to generate a prediction associated with a prediction input address for controlling a speculative action by a processor. By allowing the speculative action to be performed before the actual outcome subject to the prediction is resolved, performance can be improved.

SUMMARY

At least some examples of the present technique provide prediction circuitry to generate a prediction associated with a prediction input address for controlling a speculative action by a processor, the prediction circuitry comprising:
  combiner circuitry to determine a combined prediction by applying a prediction combination function to a given address and respective sets of prediction information generated by a plurality of predictors corresponding to the given address;
  a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
  combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

At least some examples of the present technique provide a system comprising:
  the prediction circuitry described above, implemented in at least one packaged chip;
  at least one system component; and
  a board,
  wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of prediction circuitry to generate a prediction associated with a prediction input address for controlling a speculative action by a processor, the prediction circuitry comprising:
  combiner circuitry to determine a combined prediction by applying a prediction combination function to a given address and respective sets of prediction information generated by a plurality of predictors corresponding to the given address;
  a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
  combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

At least some examples of the present technique provide a method for generating a prediction associated with a prediction input address for controlling a speculative action by a processor, the method comprising:
  looking up a combiner cache structure based on the prediction input address, the combiner cache structure comprising a plurality of combiner cache entries, where a given combiner cache entry is associated with an address indication and is indicative of a plurality of items of combined prediction information determined by combiner circuitry applying a prediction combination function to a given address corresponding to the address indication and a plurality of different combinations of possible values for respective sets of prediction information generated by a plurality of predictors corresponding to the given address;
  based on the lookup, identifying a selected combiner cache entry for which the address indication corresponds to the prediction input address; and
  generating the prediction for controlling the speculative action based on a selected item of combined prediction information selected from the selected combiner cache entry based on the respective sets of prediction information generated by the plurality of predictors corresponding to the prediction input address.

Further aspects, features and advantages of the present technique will be apparent from the following description of examples, which is to be read in conjunction with the accompanying drawings.

DESCRIPTION OF EXAMPLES

Combiner Cache Structure

Figure 1:
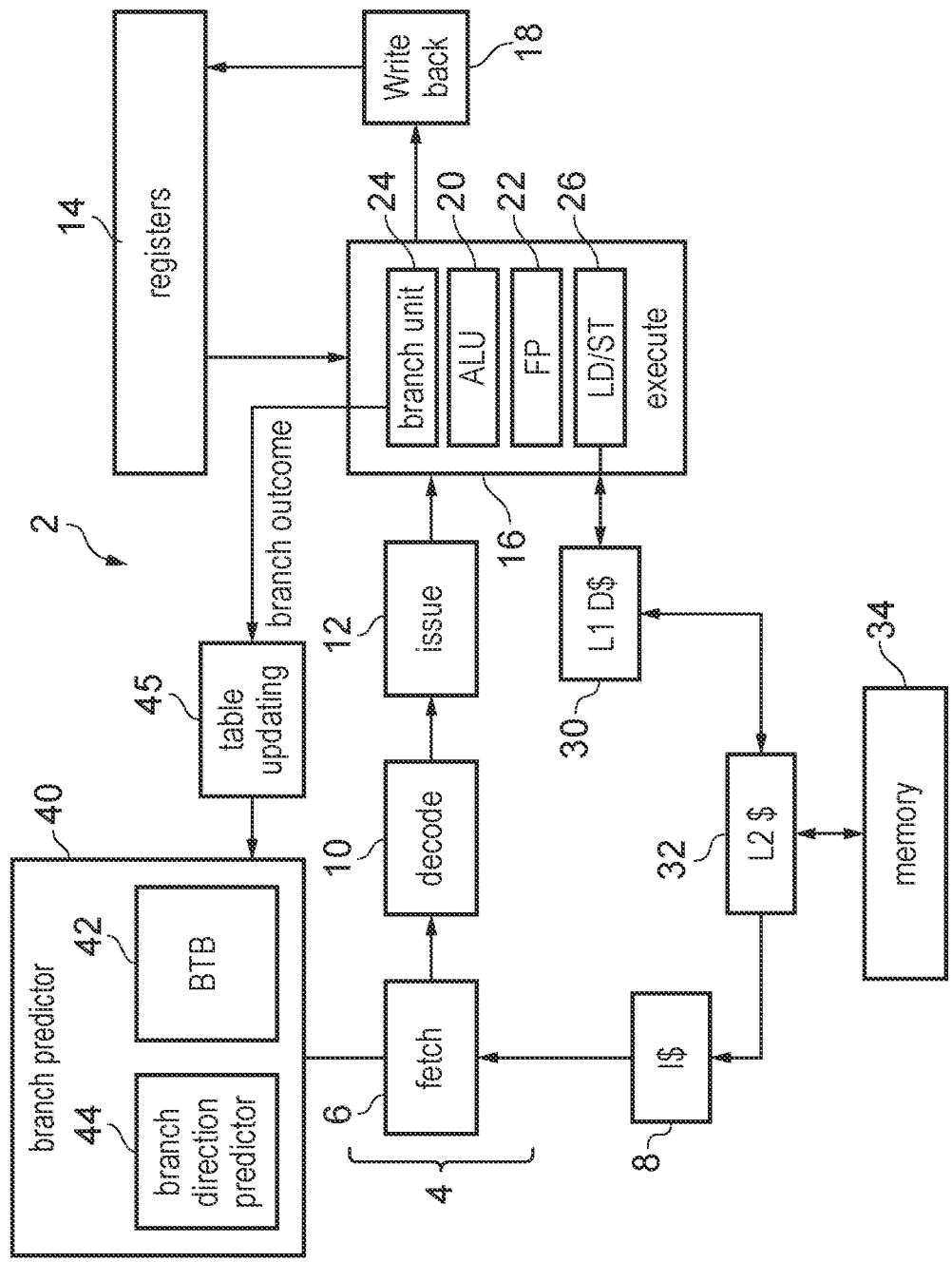
FIG. 1 illustrates an apparatus comprising prediction circuitry.

A processing system may have prediction circuitry to generate a prediction associated with a prediction input address, for controlling a speculative action by a processor. For example, the prediction could be a branch prediction or data value prediction. By speculatively performing an action based on a prediction before the actual outcome of the information being predicted is known, this can improve performance compared to waiting for the actual outcome to be determined and then performing the action non-speculatively.

A single type of predictor may not be able to handle all prediction scenarios, and so for improved prediction accuracy some prediction circuitry may combine predictions from two or more predictors. For example, the predictors may differ in terms of the prediction function used to generate the prediction and/or what inputs are used to form the prediction. Hence, the prediction circuitry may comprise combiner circuitry to determine a combined prediction by applying a prediction combination function to a given address and respective sets of prediction information generated for a given address by a plurality of predictors (including at least a first predictor and a second predictor).

However, if the combiner circuitry is implemented on the critical path used to generate the prediction that is used to control the speculative action, the combiner circuitry would be dependent on the prediction information generated by the individual predictors, and so the dependency chain becomes longer, causing extra latency in generating the prediction compared to an example which generates the prediction using a single type of predictor.

In the examples discussed below, a combiner cache structure is provided comprising a set of combiner cache entries, where a given combiner cache entry is associated with an address indication and is indicative of two or more items of combined prediction information determined by the combiner circuitry for an address corresponding to the address indication and two or more different combinations of possible values for the respective sets of prediction information generated by the respective predictors whose output is being combined to form the combined prediction. Combiner cache lookup circuitry looks up the combiner cache structure based on the prediction input address to identify a selected combiner cache entry for which the address indication corresponds to the prediction input address, and generates the prediction for controlling the speculative action based on a selected item of combined prediction information selected from the selected combiner cache entry based on the respective sets of prediction information generated by the predictors corresponding to the prediction input address.

As the combiner cache structure is looked up based on the prediction input address and caches combined prediction information for different combinations of possible values for the respective sets of prediction information, it is not necessary to obtain this prediction information before looking up the combiner cache structure. Instead, the combiner cache structure can return combined prediction information for multiple different combinations of possible values for the respective sets of prediction information, allowing a subsequent selection between these items of combined prediction information once the prediction information becomes available from the predictors.

Hence, the dependency chain is broken between the combiner cache structure lookup and lookups to the respective predictors, allowing greater flexibility to reorder these lookups or perform the lookups in parallel to improve performance. While the combiner circuitry is used to determine the combined prediction information to be stored in the combiner cache structure based on the respective sets of prediction information generated by the two or more predictors (so is dependent on a lookup to those predictors), the provision of the combiner cache structure means the combiner circuitry does not need to be accessed at the time of generating the prediction. Hence, the combiner circuitry can be moved off the critical timing path for generating predictions. Therefore, the overall latency in generating the prediction can be reduced and performance can be improved.

In some examples, the prediction combination function (applied by the combiner circuitry to combine the individual predictor's prediction information) comprises a perceptron function to generate the combined prediction based on a sum of a plurality of weights selected based on the given address and the respective sets of prediction information. The use of a perceptron function as a prediction combiner has been found to give relatively good prediction accuracy rates. However, there can be some potential disadvantages to use of a perceptron, if the perceptron had to be looked up for every prediction on the critical timing path used at prediction time. These disadvantages can be overcome by use of the combiner cache structure, which means the perceptron does not have to be looked up when generating a prediction (instead the perceptron can be looked up offline, e.g. at the time of resolving branches, and its predictions can be cached in a combiner cache structure for faster lookup). Hence, the combiner cache structure can be particularly useful when the prediction combination function is a perceptron function.

In particular, the combiner circuitry may determine the combined prediction based on entries of a plurality of untagged combiner tables indexed based on the given address and the respective sets of prediction information. These untagged combiner tables may provide the weights for the perceptron function mentioned above. As the combiner tables are untagged, each lookup indexes into a set of weights and there is no ability to determine, for a given lookup, that the combiner cannot provide a prediction for a given lookup. Each lookup will generate a prediction, which increases the likelihood of aliasing where a lookup for one address indexes into entries comprising weights generated based on resolution of a prediction for another address which may exhibit different behaviour to the first address. Such aliasing can therefore reduce the prediction accuracy provided by the combiner in a comparative example which relies on the combiner circuitry as the sole structure for combining predictions.

In contrast, the combiner cache structure may comprise a tagged cache structure, where each combiner cache entry has an associated tag value indicative of at least a portion of the address indication. This tag value may qualify the scenarios for which the combined prediction information recorded in that combiner cache entry is relevant, allowing for cases when a lookup in the combiner cache structure may detect a miss. With a tagged cache structure, detection of a hit in the cache depends on a comparison between a stored tag value associated with combiner cache entries and a value derived from the prediction input address. Some lookups may cause a miss when none of the looked up entries comprise a tag value that matches a value derived from the prediction input address. By allowing some misses, this can reduce the negative effects on prediction accuracy caused by aliasing, as some cases of address aliasing which would arise in looking up the perceptron can be filtered out when accessing the combiner cache structure, reducing the likelihood of misprediction and hence providing better performance.

Another potential disadvantage of perceptron functions based on untagged tables may be that generating a prediction for N prediction input addresses in the same cycle would require N read ports to be provided in the hardware storage structure used to provide the untagged tables. The untagged weight tables used by a perceptron mean that it is not possible to obtain multiple table entries from the same table with a single read port. This tends to limit the ability to use the perceptron function in a high-bandwidth processing pipeline expected to look up many prediction input addresses per cycle, as the circuit area cost of providing many read ports would be prohibitive. On the other hand, the combiner cache structure can be implemented as a set-associative cache structure capable of reading, in a single lookup cycle using a single read port, a set of two or more combiner cache entries associated with different address indications. If multiple read ports are provided, this can allow more than one set to be read in the same cycle. In general, the use of a tagged structure means that a single read port can read out a set of multiple entries, as the tag comparisons of each of those entries can then be used to distinguish which of the entries is the relevant entry for generating the prediction. This can support more than one hit being detected in the same set in a same lookup cycle. Therefore, the combiner cache structure can be more scalable to a high-bandwidth processing pipeline, as it requires fewer read ports for a given number of predictions processed per cycle than the untagged perceptron tables used for the combiner circuitry.

The address indication associated with a given combiner cache entry can be implemented in different ways. In some instances, the address indication can simply be a full address itself. However, it can be sufficient for the address indication to comprise a subset of bits of an address, so that a given entry can be shared between a number of addresses sharing the same values for those subset of bits (in expectation that it may be relatively unlikely that all of those addresses would be in use by the processing pipeline at a given time). In some cases, the address or subset of address bits may be used directly as the address indication. Alternatively, a hash function could be applied to the address or subset of address bits to generate the address indication. The address indication could also depend on other information in combination with the address or subset of address bits (e.g. history information, which represents information on previous behaviour seen before the prediction scenario represented by the prediction input address, could be combined with the address bits to form the address indication).

For the set-associative cache structure mentioned above, a portion of the address indication may be used as the tag value, with another portion of the address indication used as an index value for selecting which set of combiner cache entries is to be accessed during a lookup for a given prediction input address. Hence, it may be the combination of index and tag which represents the address indication associated with a given combiner cache entry. The set of two or more combiner cache entries read in a single lookup cycle may comprise combiner cache entries for which the different address indications of those entries correspond to the same index but have different tag values.

The combiner circuitry does not need to be consulted at the time of generating a prediction. Instead, it can be updated at the time of resolution of an actual outcome associated with a previous prediction and any updates to the combiner circuitry's internal state can be propagated through to the combiner cache structure for use in subsequent predictions. Hence, in response to resolution of an actual outcome associated with a prediction for a previous prediction input address, the combiner circuitry may update combiner prediction state information associated with the previous prediction input address, and update a corresponding combiner cache entry of the combiner cache structure corresponding to the previous prediction input address, based on an updated combined prediction determined by applying the prediction combination function to the updated combiner prediction state information associated with the previous prediction input address.

The update to the corresponding combiner cache entry can vary in terms of how many of the items of combined prediction information are updated based on the updated combiner prediction state information.

For example, the update to the corresponding combiner cache entry may comprise updating at least a target item of combined prediction information selected based on a specific combination of values of the respective sets of prediction information generated by the two or more predictors corresponding to the previous prediction input address. For example, the sets of prediction information previously generated at prediction time when a prediction was made for the previous prediction input address may be buffered until resolution time and used to apply the combination function to the updated combiner prediction state information and to select which item of combined prediction information is the target item to be updated based on the combined prediction information. Alternatively, the predictors could be looked up again at resolution time to determine which combination of values of the respective sets of prediction information should have the corresponding item of combined prediction information updated.

In some examples, the update to the corresponding combiner cache entry comprises updating at least two items of combined prediction information of the corresponding combiner cache entry, based on applying the prediction combination function to the updated combiner prediction state information for the previous prediction input address and at least two different combinations of values for the respective sets of prediction information. For example, the combiner circuitry can scan through multiple possible combinations of the values of the respective sets of prediction information, generating updated combiner prediction state information for each combination based on the resolved actual outcome, and propagating the corresponding result of applying the combination function to the updated combiner prediction state information to a corresponding item of combined prediction information in the corresponding combiner cache entry.

In response to determining, when the update of the corresponding cache entry of the combiner cache structure based on the updated combiner prediction state information would require allocation of a new combiner cache entry to the combiner cache structure, that each valid item of combined prediction information to be specified in the new combiner cache entry based on the updated combined prediction satisfies a redundant allocation condition, the combiner circuitry may suppress allocation of the new combiner cache entry to the combiner cache structure. For a given item of combined prediction information, selection of the given item of combined prediction information as the selected item of combined prediction information would depend on first prediction information generated by a first predictor of the plurality of predictors corresponding to a given prediction outcome. The given item of combined prediction information satisfies the redundant allocation condition when the updated combined prediction to be specified in the given item of combined prediction information specifies the same prediction outcome as the given prediction outcome for the given item of combined prediction information.

This recognises that on many occasions, the combined prediction resulting from the combiner cache function may give the same outcome as the prediction which would need to be made by the first predictor in order for the corresponding item of combined prediction information in the corresponding combiner cache entry to be selected for making a prediction, and so in that case there is no need to allocate a combiner cache entry for that combined prediction. By using an allocation policy which filters out allocation of combined prediction information which would merely duplicate the first predictor's prediction in the case where that item of combined prediction information would be selected, this can help to conserve space in the combiner cache. Also, this can help to reduce the number of combiner cache read ports needed to process a given number of predictions per cycle, as it can be expected that for a given number of predictions to be processed per cycle, a significant number of these may not require an entry to be allocated in the combiner cache structure at all, and so a smaller number of read ports can be sufficient. Hence, this allocation policy of not allocating new entries which would merely duplicate the behaviour predicted by the first predictor can enable a significant circuit area saving compared to an example which allocates into the combiner cache even for combined prediction information which would indicate the same prediction outcome as the prediction made by the first predictor in the case when that item of combined prediction information is selected. Also, this allocation policy reduces the risk of aliasing as allocations are less frequent and the filtering of allocations eliminates an aliasing effect between one address associated with a prediction matching the first predictor's prediction and another address mapping to the same entry associated with a prediction not matching the first predictor's prediction— the first address's allocation would be filtered out preserving the cache capacity for the second address's prediction information. Hence, performance can also be improved as a result of this allocation policy.

Similarly, in a case where a new combiner cache entry is allocated because there is at least one valid item of combined prediction information which provides a different prediction outcome to the outcome which would need to be predicted by the first predictor in order for that valid item to be selected for making the prediction, another item of combined prediction generated by the combiner circuitry for a different combination of values for the respective sets of prediction information could be suppressed from being allocated as a valid item of combined prediction information (and hence the corresponding item of combined prediction information may remain invalid) if that other item would have indicated the same prediction outcome as the outcome needed for the prediction made by the first predictor in order for that other item to be selected as the selected item for generating the prediction.

Given this allocation policy, misses in the combiner cache structure may be handled by outputting the first predictor's prediction as the prediction used for controlling the speculative action. Hence, in response to the combiner cache lookup circuitry detecting a miss in the combiner cache structure for the prediction input address, the combiner cache lookup circuitry may generate the prediction for controlling the speculative action based on a prediction made by the first predictor, independent of a prediction made by a second predictor. As noted below, in some instances this means that the lookup of the second predictor may become redundant and can be suppressed to save power.

Hence, initially allocations of new entries into the combiner cache structure may be filtered based on whether the allocated combined prediction information would differ from the prediction which would need to be made by the first predictor in order for that combined prediction information to be selected for generating a prediction. Nevertheless, it is still possible for some of entries of the combiner cache structure to indicate valid items of combined prediction information that indicate a same prediction outcome as the prediction which would be made by the first predictor in the case where that valid item of combined prediction information is selected by the combiner cache lookup circuitry. This is because the items of combined prediction information in a given combiner cache entry may, after that entry has been allocated, continue to be updated based on corresponding updates to the combiner prediction state information used by the combiner circuitry, and so if the observed behaviour of resolved outcomes changes, this can cause a combiner cache entry which was initially allocated specifying a different prediction outcome to the first predictor's prediction to later be updated to specify the same outcome as the first predictor's prediction.

When the selected combiner cache entry is returned in a lookup of the combiner cache based on the prediction input address, the relevant item of combined prediction information is selected based on the respective sets of prediction information provided by at least a first predictor and a second predictor (and optionally at least one further predictor). It is not essential to use all of the prediction information generated by each predictor to select which item of combined prediction information to use. In some cases, the portions of the respective sets of prediction information used to select between the items of combined prediction information can be a subset of the respective sets of prediction information used by the combiner circuitry for the prediction combination function.

For example, the first prediction information generated by the first predictor may comprise a first prediction confidence and a first prediction outcome, and the second prediction information generated by the second predictor may comprise a second prediction confidence and a second prediction outcome, but the second prediction outcome may be excluded from the portion of the second prediction information used to select between the items of combined prediction information in the corresponding combiner cache entry. This approach could be useful if the prediction outcomes are selected from two possible values (e.g. taken and not-taken for a branch prediction), and given the allocation policy described above, for new allocations it can be implicit that, in order for a valid item of combined prediction information to be allocated, the second prediction information would indicate the opposite prediction outcome to the first prediction information, so the first prediction outcome can be sufficient to represent both first and second prediction outcomes. By excluding the second prediction outcome from the set of information used to select between the items of combined prediction information in a given combiner cache entry, this reduces the number of bits of prediction state used to select between the items, and hence the number of possible value combinations for those bits of prediction state. Therefore, fewer items of combined prediction information are needed to cover every possible value combination, reducing the storage overhead of the combiner cache and associated power costs associated with updating those items.

The given combiner cache entry may comprise a plurality of valid indications indicative of validity of the plurality of items of combined prediction information respectively, and the combiner cache lookup circuitry may treat the prediction input address as missing in the combiner cache structure in response to determining that the combiner cache structure includes the selected combiner cache entry for which the address indication corresponds to the prediction input address but the selected item of combined prediction information is indicated as invalid by a corresponding one of the valid indications. Hence, it is not necessary for all items of combined prediction information in a given combiner cache entry to be valid. This gives flexibility for implementations which may, at the time of updating a given combiner cache entry based on updated combiner prediction state information at the combiner circuitry, prefer not to incur the cost of scanning through all possible combinations of values for the first/second prediction information, which could be costly in terms of power consumption.

The use of the combiner cache structure allows for more flexible choices on timings of looking up the various structures involved in generating a prediction, compared to an approach where the combiner circuitry itself is used directly in the prediction generation, as the combiner cache structure can be looked up based on the prediction input address regardless of whether the two or more predictors have generated their sets of prediction information yet.

For example, the combiner cache lookup circuitry may initiate a lookup of the combiner cache structure based on the prediction input address before a set of prediction information corresponding to the prediction input address becomes available from at least one of the predictors. This can help to improve performance.

In some examples, the combined prediction selection circuitry may select a subset of the items of combined prediction information of the selected combiner cache entry based on first prediction information generated corresponding to the prediction input address by a first predictor, before the second prediction information corresponding to the prediction input address becomes available from a second predictor. This can help to improve performance in cases where the second predictor is slower than the first predictor (e.g. because it relies on prediction inputs which require additional stages of lookup compared to prediction inputs used by the first predictor).

For example, the second predictor may generate the second prediction information based on a lookup of a second predictor structure based on local history information tracking history for a specific subset of addresses including the prediction target address; and the first predictor may generate first prediction information based on a lookup of a first predictor structure independent of the local history information. For example, the first predictor may generate the first prediction information based on global history information which tracks a shared history common to all addresses. As accessing the local history information involves selection between a number of sets of local history information based on the prediction target address, it can be slower to look up the local history information than the global history information, and so the second predictor may be slower to generate a prediction than the first predictor. Hence, removing the dependency of the combiner on the second predictor, by providing the combiner cache which can be looked up independent of the second prediction information, can be particularly helpful when the second predictor uses local history information.

In some examples, the first predictor comprises a first TAGE (tagged-geometric) predictor comprising a first set of tagged-geometric tables looked up based on different lengths of first history information; and the second predictor comprises a second TAGE predictor comprising a second set of tagged-geometric tables looked up based on different lengths of second history information. Prediction circuitry using a combiner to combine predictions from multiple TAGE predictors has been found to give particularly good prediction accuracy, but previous implementations providing a perceptron function as the combiner have struggled to make this implementable in a processing pipeline supporting high prediction bandwidth, given the latency associated with providing a dependency chain where the perceptron is applied on the outputs of the TAGE predictors and the read port implications of looking up untagged perceptron weight tables on the critical timing path for generating predictions. These problems can be addressed by provision of the combiner cache structure where the lookup of the combiner cache structure can be initiated before the TAGE predictors have completed their prediction, and a tagged structure can be used for the combiner cache structure.

The techniques discussed above can be used for a variety of types of prediction made for a processor. For example, the prediction could be a value prediction (for predicting in advance a data value which may be loaded from memory or received as an operand for an instruction) or an address prediction (for predicting an address expected to be subject to a load/store memory access). For a data value prediction, the speculative action controlled based on the prediction may be the processing of an instruction based on the predicted data value. for an address prediction, the speculative action controlled based on the prediction may be the issuing of a load/store request to memory based on the predicted address.

However, the techniques discussed above can be particularly useful where the prediction comprises a branch prediction. In particular, the prediction may be a branch direction prediction indicating whether a branch is predicted to be taken or not-taken. In this case, the speculative action comprises fetching of a subsequent instruction after the branch based on whether the branch is predicted to be taken or not-taken (with a different instruction being selected as the subsequent instruction depending on whether the branch is predicted to be taken or not-taken).

Second Predictor Lookup Suppression

Combiner circuitry may generate a combined prediction associated with a given address based on combining respective sets of prediction information generated by two or more predictors corresponding to the given address. The combiner circuitry generates the combined prediction using combiner prediction state information obtained in a lookup of at least one combiner table structure based on the given address and the respective sets of prediction information. As mentioned above, combining predictions from more than one predictor can be useful to improve prediction success rate as a second predictor can help deal with scenarios that cannot accurately be predicted by a first predictor. However, the inventors recognised that the scenarios handled more accurately by the second predictor may be relatively rare and for a significant fraction of predictions, the combined prediction may provide an outcome derivable from the prediction outcome predicted by the first predictor.

Hence, predictor control circuitry may be provided to determine, based on a lookup of the prediction input address in a combiner hint data structure, whether a second predictor lookup suppression condition is satisfied for the prediction input address indicating that the combined prediction that would be determined by the combiner circuitry for the prediction input address is likely to be derivable from a prediction outcome predicted by the first predictor for the prediction input address without looking up the second predictor. In response to determining that the second predictor lookup suppression condition is satisfied, the predictor control circuitry suppresses a lookup of the second predictor based on the prediction input address, and generates the prediction associated with the prediction input address based on the prediction outcome predicted by the first predictor for the prediction input address.

By using a combiner hint data structure to provide hints on whether the combined prediction is likely to be derivable from the first predictor's output, power can be saved by suppressing the lookup of the second predictor when the second predictor is unlikely to provide information needed for determining the combined prediction as the hint indicates that the combined prediction can be determined from the first predictor's output alone.

While the examples discussed here describe the lookup suppression in the context of a second predictor used in combination with a first predictor to form combined predictions, it will be appreciated that other examples may combine outputs of three or more predictors to form a combined prediction, and in that case similar lookup suppression techniques may be used for the third predictor, fourth predictor, etc. Hence, the "first predictor" and "second predictor" mentioned in the examples below may be any two predictors of two or more predictors whose outputs are combined to form the combined prediction.

The prediction circuitry may comprise a combiner cache structure comprising a plurality of combiner cache entries, where a given combiner cache entry is associated with a corresponding address indication and is indicative of a plurality of items of combined prediction information determined by the combiner circuitry for an address corresponding to the address indication and a plurality of different combinations of possible values for the respective sets of prediction information provided by two or more predictors. As noted above, the combiner cache structure can be helpful to reduce latency when generating the prediction based on prediction information from multiple predictors. Another advantage of the combiner cache is that, as it specifies combined predictions for a number of different combinations of possible values for the respective sets of prediction information, it can also be helpful in providing summary information which can efficiently allow a determination of whether, regardless of a lookup of the second predictor, the combined prediction would be derivable from the prediction outcome predicted by the first predictor. Hence, the use of a combiner cache can present an opportunity to use the information in the combiner cache to generate hints on whether the second predictor lookup suppression condition is satisfied.

When the second predictor lookup suppression condition is not satisfied, the predictor control circuitry selects the prediction associated with the prediction input address based on a selected item of combined prediction information obtained from a selected combiner cache entry for which the address indication corresponds to the prediction input address. The selected item of combined prediction information comprises the item of combined prediction information which corresponds to a values of the respective sets of prediction information determined by the two or more predictors corresponding to the prediction input address. In contrast, when the second predictor lookup suppression condition is satisfied, the predictor control circuitry selects the prediction associated with the prediction input address based on the output of the first predictor, not the combined prediction information in the combiner cache structure. As mentioned above, the combiner circuitry itself is not used at prediction time, but is updated at resolve time to generate the combined prediction information written to the combiner cache structure.

The predictor control circuitry may determine whether the second predictor lookup suppression condition is satisfied for the prediction input address depending on analysis of at least a subset of the items of combined prediction information specified by the selected combiner cache entry. This analysis could be done either at the time of making a prediction, or in advance of making a prediction to generate hints which may be cached in the combiner cache structure or in a separate structure, for lookup at the time of making a prediction. for example, a hint corresponding to a given combiner cache entry could be generated at the time of updating the combined prediction information stored in that combiner cache entry. Regardless of the specific timing at which the combined prediction information stored in a given combiner cache entry is analysed to generate the hints used to evaluate the second predictor lookup suppression condition, the use of the combiner cache can make it simpler to generate such hints than if the hints were to be derived directly from a lookup to the combiner circuitry.

In some examples, the combiner hint data structure comprises the combiner cache structure itself. Hence, the lookup to the combiner cache structure performed for a prediction input address at the time of making a prediction can also be used to identify hint information that can be used to evaluate the second predictor lookup suppression condition. This hint information could in some cases simply be the set of items of combined prediction information which can be analysed by the predictor control circuitry dynamically at lookup time, to determine whether it is likely that the combined prediction would be derivable from the prediction made by the first predictor without a second predictor lookup. Alternatively, the hint information could be separate from the items of combined prediction information in the looked up combiner cache entry, as the hint information could be pre-computed from the items of combined prediction information in advance, to reduce the depth of circuit logic used (and hence latency incurred) at the time of making a prediction.

In other examples, the combiner hint data structure may be separate from the combiner cache structure and may store combiner hint information providing a summary of information derivable from the combiner cache structure. Hence, combiner hint information can be pre-computed in advance from the information stored in the combiner cache structure, and cached in the combiner hint data structure which may provide a denser representation of hints relevant to determining whether the second predictor lookup suppression condition is satisfied. This may be more efficient in some instances as a smaller structure may be used for the combiner hint data structure than for the combiner cache structure, reducing power consumption costs and latency in looking up the smaller structure. Also this approach can allow the lookup of the larger combiner cache structure to be suppressed on occasions where the smaller combiner hint data structure identifies that the prediction can be derivable from the first predictor's output, which can save power by avoiding unnecessarily incurring the cost of reading out a set of entries from the combiner structure and performing corresponding tag comparisons.

Hence, unless otherwise specified, the term "combiner hint data structure" is used to refer either to the combiner cache structure itself or to a separate structure used to lookup information providing a hint on whether the second predictor lookup is likely to be redundant.

As noted above for the combiner cache examples, the combiner cache can be updated at resolve time based on corresponding updates to the prediction state used by the combiner circuitry. Hence, in response to resolution of an actual outcome associated with a prediction for a previous prediction input address, the combiner circuitry may update the combiner prediction state information of the at least one combiner table structure corresponding to the previous prediction input address; and update a corresponding combiner cache entry of the combiner cache structure corresponding to the previous prediction input address, based on an updated combined prediction generated from the updated combiner prediction state information. At this time, hint information could also be derived from the set of items of combined prediction information specified by the corresponding combiner cache entry and the hint information could either be recorded in the corresponding combiner cache entry itself or recorded in a separate hint structure, for use at prediction time in evaluating the second predictor lookup suppression condition.

The combiner circuitry is configured to suppress allocation of a new combiner cache entry to the combiner cache structure in response to a determination that each valid item of combined prediction information to be specified in the new combiner cache entry based on the updated combined prediction satisfies a redundant allocation condition. For a given item of combined prediction information, selection of the given item of combined prediction information as a selected item of combined prediction information to be used for generating the prediction depends on first prediction information generated by the first predictor corresponding to a given prediction outcome. The given item of combined prediction information satisfies the redundant allocation condition when the updated combined prediction to be specified in the given item of combined prediction information specifies the same prediction outcome as the given prediction outcome As noted above, this allocation policy, which suppresses allocations which would merely mirror the corresponding first predictor output, can make more efficient use of the available storage capacity of the combiner cache structure, reduce the number of read ports needed for the combiner cache structure to support a given number of predictions per cycle, and filter out cases of aliasing.

However, another advantage of this allocation policy can be that it offers greater opportunities for power saving by suppressing the lookup to the second predictor. The predictor control circuitry may determine that the second predictor lookup suppression condition is satisfied in response to determining, based on the lookup of the prediction input address in the combiner hint data structure, that a miss would be detected in a lookup of the prediction input address in the combiner cache structure. The detection of a miss in the combiner cache structure could be detected either by actually looking up the combiner cache structure for the prediction input address (in this case the combiner cache structure also acts as the combiner hint data structure), or by looking up a separate combiner hint data structure which provides a hint on whether a lookup in the combiner cache structure for the prediction input address is expected to cause a miss to be detected in the combiner cache structure. Either way, given the allocation policy mentioned above, a miss in the combiner cache structure may signal that either no prediction information has been encountered before for that address, or that prediction information been made but its outcome was the same as the outcome generated by the first predictor. In both cases, this means the second predictor will not override the first predictor's prediction, and so the lookup to the second predictor can be suppressed to save power.

In some examples, the predictor control circuitry may determine that the second predictor lookup suppression condition is satisfied in response to determining, based on the lookup of the prediction input address in the combiner hint data structure, that all valid items of combined prediction information indicated by a combiner cache entry corresponding to the prediction input address satisfy a derivable condition. A given valid item of combined prediction information, that is associated with a given possible value for first prediction information generated by the first predictor, satisfies the derivable condition when the given valid item of combined prediction information indicates a combined prediction which is derivable from the prediction outcome that would be predicted by the first predictor for the prediction input address when the first prediction information generated by the first predictor has the given possible value. Hence, even if a lookup of the combiner cache entry would detect a hit against a valid entry, if all the valid items of combined prediction information in that entry would give a combined prediction result that would be derivable from the prediction made by the first predictor in the scenario where that valid item would have been selected for making a prediction, then there is no need to look up the second predictor and power can be saved because regardless of the output of the second predictor, selection of any valid item would lead to a prediction consistent with the first predictor's output.

In some examples, the given valid item may satisfy the derivable condition when the given valid item indicates a combined prediction providing the same prediction outcome as the outcome that would be predicted by the first predictor for the prediction input address when the first prediction information generated by the first predictor has the given possible value. In this case, when the second predictor lookup suppression condition is satisfied, the prediction outcome predicted by the first predictor can simply be output unchanged as the overall combined prediction.

In some examples, where the prediction is a type of prediction which has two possible outcomes (e.g. taken and not-taken for a branch direction prediction), the combined prediction may be considered derivable from the prediction outcome predicted by the first predictor for the prediction input address when the combined prediction provides the opposite outcome to the prediction outcome predicted by the first predictor for the prediction input address. Hence, in this case, the derivable condition may be considered satisfied by the given valid item of combined prediction information when it indicates a combined prediction which provides the opposite outcome as the prediction outcome that would be predicted by the first predictor for the prediction input address when the first prediction information generated by the first predictor has the given possible value associated with that valid item of combined prediction information.

Some implementations may apply both variants of derivable condition (same outcome as first predictor, or opposite outcome as first predictor), so that the second predictor lookup suppression condition can be considered satisfied if either all valid items of combined prediction information satisfy the first variant (based on same outcome as first predictor), or all valid items of combined prediction information satisfy the second variant (based on the opposite outcome to the first predictor).

In another example, if first prediction information can be available from the first predictor in time to allow it to be used in deciding whether to suppress the lookup to the second predictor, this can be used to pre-select which items of combined prediction information are relevant to be considered for evaluating the second predictor lookup suppression condition, given the specific value of the first prediction information generated for the prediction input address. This means that even if other items of combined prediction information which do not correspond to the specific value of the first prediction information generated for the prediction input address would not satisfy the derivable condition, the second predictor's lookup can still be suppressed if all valid items in the pre-selected subset of items of combined prediction information selected based on the specific value of the first prediction information meet the derivable condition. This can provide further opportunities for power saving.

Hence, with this example, the predictor control circuitry may determine that the second predictor lookup suppression condition is satisfied in response to determining, based on the lookup of the prediction input address in the combiner hint data structure, that all valid items of combined prediction information in a selected subset of items of combined prediction information indicated by a combiner cache entry corresponding to the prediction input address satisfy the derivable condition. The selected subset of items may comprise the items of combined prediction information which correspond to a specific value of the first prediction information generated by the first predictor for the prediction input address and a plurality of different possible values for the second prediction information.

In some examples, at least when a predetermined second predictor lookup suppression mode is enabled, the predictor control circuitry may determine that the second predictor lookup suppression condition is satisfied in response to determining, based on the lookup of the prediction input address in the combiner hint data structure, that less than a predetermined fraction of valid items of combined prediction information indicated by a combiner cache entry corresponding to the prediction input address do not satisfy the derivable condition. Hence, even if there is a valid item that does not satisfy the derivable condition, if most of the valid items of combined prediction information could be derivable from the first predictor output when the first prediction information has the corresponding possible value required for selection of that valid item, but there is one item (or a few items) which do not meet this condition, then nevertheless the second predictor lookup could be suppressed (taking the risk that the item of combined prediction information which would deviate from the first predictor's output would not in any case have been selected if the second predictor had been looked up and its generated second prediction information was used to select between the items of combined prediction information). This approach can be useful to achieve further power savings, because there can be a scenario in which a combiner cache entry may initially be allocated with an item of combined prediction state indicating a prediction deviating from the first prediction output for a certain transiently occurring combination of values for the address and respective sets of prediction information, but which subsequently never gets used after that initial transient period has elapsed. By enabling the second predictor lookup to be suppressed even if there is an isolated item of combined prediction state which could have given a different result to the first predictor's output, this can yield greater power savings.

In some implementations which support this option to satisfy the second predictor lookup suppression condition even if there is a valid item of combined prediction information not satisfying the derivable condition, the predetermined second predictor lookup suppression mode could be considered permanently enabled, so that this mode is always used.

However, other examples may support the option of disabling the predetermined second predictor lookup suppression mode, either based on a static configuration setting which does not vary at runtime, or based on dynamic monitoring of mispredictions. Use of the predetermined second predictor lookup suppression mode may sometimes risk reducing processing performance because it can lead to a greater number of mispredictions for some workloads. For other workloads the predetermined second predictor lookup suppression mode may not affect the prediction accuracy and so it may be preferred to enable that mode to enable greater power savings. Hence, by supporting the option to selectively enable and disable the predetermined second predictor lookup suppression mode, this can provide configuration options to trade-off performance against power savings and allow an approach to be taken which is better adapted to the specific workload being processed.

In particular, in some cases the predictor control circuitry may control whether the predetermined second predictor lookup suppression mode is enabled or disabled based on monitoring of a misprediction heuristic. Often, it may be difficult to predict in advance whether a given workload is likely to benefit from the predetermined second predictor lookup suppression mode or would experience reduced rates of correct predictions if the predetermined second predictor lookup suppression mode was used. Therefore, by dynamically monitoring a misprediction heuristic (either globally for all prediction input addresses, or locally for respective subsets of addresses so that a more targeted decision for a specific address range can be made on whether to apply the predetermined second predictor lookup suppression mode when determining whether to suppress the second predictor lookup), this can enable the behaviour of a particular workload to be taken into account, to give a better trade off between power savings and prediction accuracy.

It will be appreciated that it is not necessary to use all of the techniques discussed above for determining whether the second predictor lookup suppression condition is satisfied. One or more of these techniques may be used in combination.

In some examples, the second predictor may generate second prediction information based on a lookup of a second predictor structure based on local history information tracking history for a specific subset of addresses including the prediction target address; and the first predictor may generate first prediction information based on a lookup of a first predictor structure independent of the local history information. For example, the first predictor structure may be looked up by the first predictor based on global history information. While the local history information can enable the second predictor to provide more tailored predictions specific to a given region of the address space, which can help to predict some scenarios which are hard to predictor with the first predictor based on global history, the fraction of overall predictions which rely on the second predictor output may be much lower than those which can adequately be predicted based on the first predictor. Therefore, prediction circuitry which combines a local-history-based predictor with a global-history-based predictor can particularly benefit from use of the techniques discussed above to suppress lookups to the local-history-based predictor when the global history-based predictor is sufficient.

In some examples, the first predictor comprises a first TAGE (tagged-geometric) predictor comprising a first set of tagged-geometric tables looked up based on different lengths of first history information; and the second predictor comprises a second TAGE predictor comprising a second set of tagged-geometric tables looked up based on different lengths of second history information. For example, the first history information can be global history and the second history information can be local history specific to a given subset of addresses. More generally, updates to the second history information may be filtered to a greater extent than updates to the first history information. It has been found that a prediction which combines multiple TAGE predictions together can provide good performance by enabling prediction of hard-to-predict scenarios which are difficult to predict with the first predictor alone, but the inventors recognised that on a significant fraction of predictions the lookup to the second TAGE predictor is redundant. Looking up a TAGE predictor can be relatively power intensive as it requires tag comparisons entries in multiple tables. By suppressing the second TAGE predictor when it is considered unlikely to be useful, this can help save power.

Again, the technique of suppressing the second predictor lookup can be applied to a wide range of types of prediction, including data value prediction and address prediction, but the technique can be particularly useful where the prediction comprises a branch prediction.

SPECIFIC EXAMPLES

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of a possible pipeline structure, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Table updating circuitry 45 is provided for updating branch prediction state information in the BTB 42 and branch direction predictor 44, based on resolved branch outcomes determined by the branch unit 24 for executed branch instructions.

Figure 2:
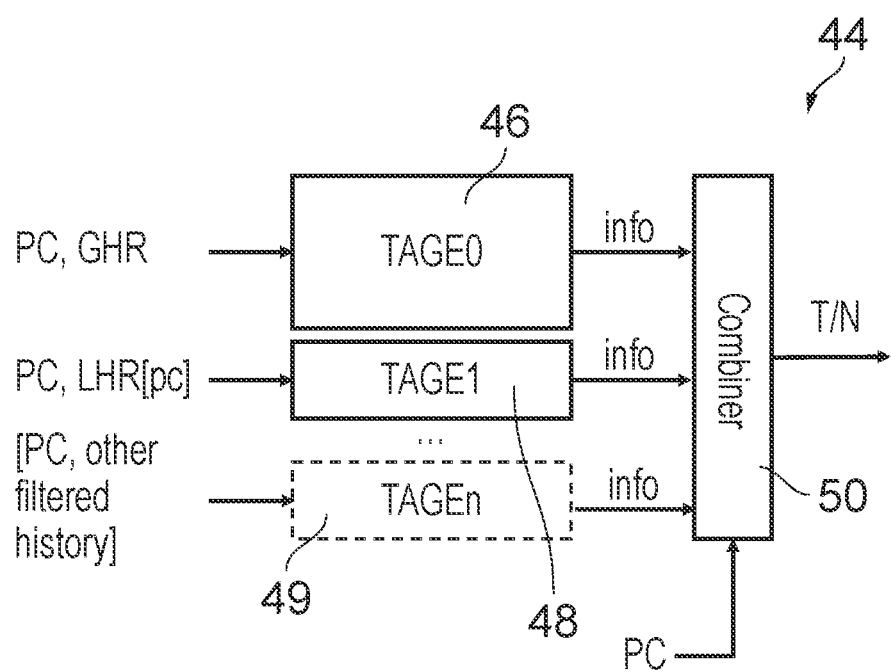
FIG. 2 illustrates combiner circuitry to generate a combined prediction based on sets of prediction information generated by two or more predictors.

FIG. 2 illustrates an example of the branch direction predictor 44, which is a specific example of prediction circuitry for generating a prediction used to control a speculative action by a processor. The prediction circuitry 44 comprises at least a first predictor 46, a second predictor 48. Optionally, the prediction circuitry 44 could also include at least one further predictor 49. Hence, in general there are two or more predictors 46, 48, 49 which, in the specific example of use as a branch direction predictor, each provide a corresponding prediction of the branch direction based on a prediction input address (e.g. a program counter (PC)) and other lookup information (which can vary depending on the type of predictor 46, 48, 49). Combiner circuitry 50 is provided to combine the prediction information generated by each predictor 46, 48, 49, to generate a combined prediction (in this case, indicating the taken/not-taken direction prediction for a branch) corresponding to the prediction input address.

In this example, each of the predictors 46, 48, 49 is a TAGE (TAgged GEometric) predictor, and so the first predictor 46 is labelled TAGE0, the second predictor 48 is labelled TAGE1, and the further predictor 49 is labelled TAGEn. An example structure of a TAGE predictor will be described in more detail below with respect to FIG. 4. It will be appreciated that the prediction combining techniques discussed here could also be applied to other types of predictors, so TAGE is just an example.

The prediction information generated by the respective predictors 46, 48, 49 could, for example, include a prediction confidence (expressing a level of confidence in the prediction) and the predicted outcome (e.g. branch direction—taken or not-taken).

In this example, first lookup information used to look up the first predictor 46 includes a program counter (PC) address (also referred to as prediction input address) representing a point in program flow for which are predictions to be made, and global history information provided by a global history register (GHR), and second lookup information used to look up the second predictor 48 includes the PC address and local history information provided by one of a number of local history registers (LHRs) selected based on the PC. The LHR is one example of filtered history which is updated based on outcomes of branches filtered based on some property of the branch (in the case of the LHRs, based on the instruction address (PC) of the branch). However, other examples of filtered history are also possible, and could be used to look up the further predictor 49 (or to look up the second predictor 48 in an alternative embodiment). Hence, the local history information 54, for which the filtered subset of branches used to update the history information are filtered based on the PC address of the branch, is just one example of filtered history information. Other examples of history filtering can include filtering branches based on whether they are forwards branches or backwards branches (where forward branches branch to a target address which is greater than the instruction address of the branch and backwards branches branch to a target address which is less than the instruction address of the branch), or based on frequency of occurrence of the branch (e.g. branches which are detected as occurring less frequently or more frequently than a certain threshold may be selected for updating the more specific filtered history information. Therefore, it will be appreciated that other examples may use different types of history information as inputs to the predictors.

Figure 3:
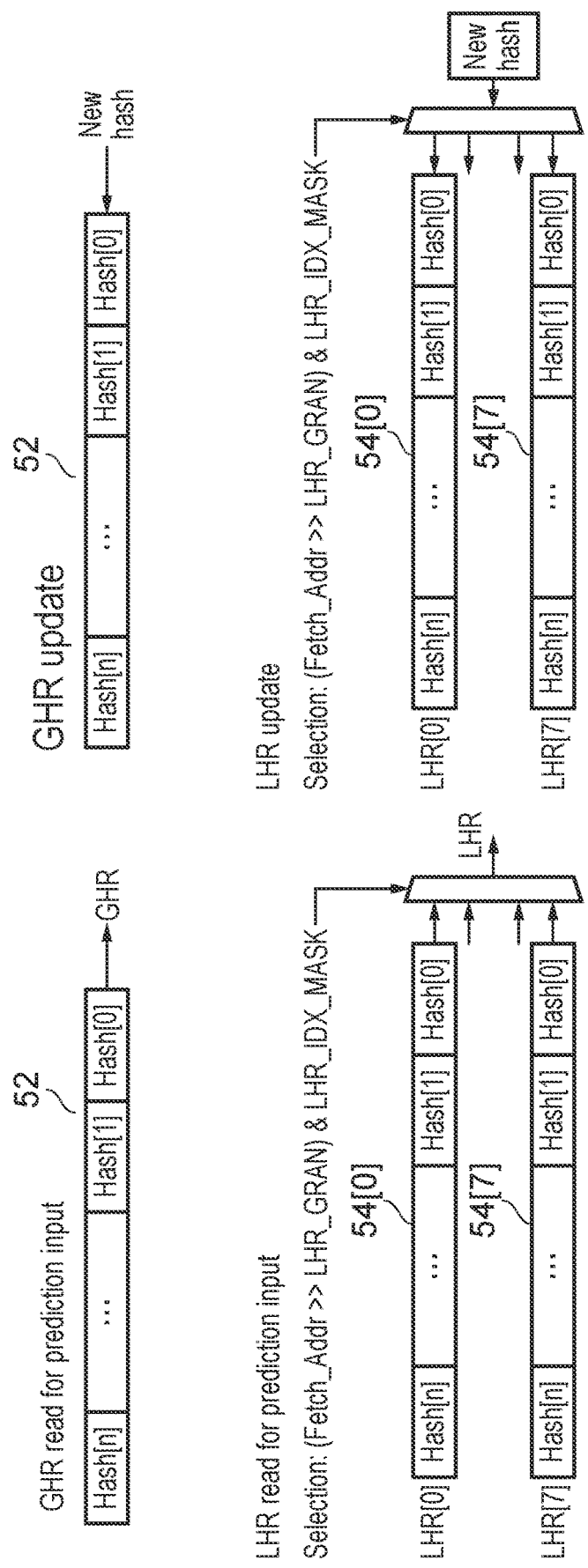
FIG. 3 illustrates global history information and local history information.

Nevertheless, FIG. 3 illustrates the concept of global history and local history in more detail. As shown in FIG. 3, a global history register 52 includes a number of fields each providing a hash of information associated with a given branch instruction, such as its branch instruction address (address at which the branch instruction itself is stored), branch target address (address to which program flow is directed by the branch if taken), and/or branch taken/not-taken outcome. Each time a branch is encountered, a new hash is logically pushed into the register and the previous contents of the register is logically shifted up one place and the oldest entry logically dropping out of the portion of history used for prediction (in practice, such information about the oldest entry may be retained for a time to permit restoration of branch prediction state following a misprediction). The current value of the GHR is read when a prediction input is required to make a prediction for a subsequent branch. The GHR 52 is shared between all branches, so captures a snapshot of information about the most recent N branches (ordered by recency of the branches), which can be useful information for distinguishing between different parts of program flow leading to the same PC, which may be relevant for determining branch behaviour for the branch at the PC address. The GHR 52 captures a common set of history for all branches.

In contrast, a set of LHRs 54[0] to 54[7] is provided for capturing sets of local history which are specific to branches associated with a particular set of addresses. Each LHR 54 is associated with a different subset ("bucket") of addresses. When a branch is encountered, a hash of relevant branch information (e.g. branch instruction address, branch target address and/or branch direction (taken/not-taken) information) is pushed into one of the LHRs 54[0] . . . 54[7] selected based on the branch instruction address of the branch, with previous contents being logically shifted up one position and the oldest entry of that LHR dropping out of the portion of history used for prediction. For example, the particular LHR 54 to be used could be selected based on a subset of bits of the branch instruction address. When a prediction is to be made, a subset of bits of the PC used as the prediction input address are used to select which of the LHRs 54 should be accessed, and the content of the selected LHR 54 is used as the input for a predictor lookup.

While FIG. 3 shows the GHR 52 and LHRs 54 logically as a shift register, where new hashes are shifted in at one end and this may cause old history information to be shifted out at the other end, in practice the GHR 52 and LHRs 54 may be implemented as circular buffers where the information stored in a given entry of the register remains at a static location until it is overwritten, and a buffer pointer is used to track the effective start of the buffer so that the pointer circles round the register as new hash information is written to register. Hence, it is not necessary to actually cause each entry of the buffer to be shifted to the neighbouring buffer position each time a new hash is pushed into the buffer. When part of the GHR 52 or LHR's 54 is to be read for a prediction input, the pointer can be used to determine which part of the buffer should be read and to rotate information read from the buffer so that the newest entry is aligned to a particular position in the read out value used for the prediction (this functionality is indicated in examples in FIGS. 11, 23 and 24 below, where the "live LHRs" refer to the rotated "live data" extracted from the position in the circular LHR buffers 54 identified based on a buffer pointer for each buffer). Although not shown for the GHR in FIGS. 11, 23 and 24 for conciseness, a similar circular buffer approach with reconstruction of the "live" GHR data based on a pointer can be used for the GHR.

Figure 4:
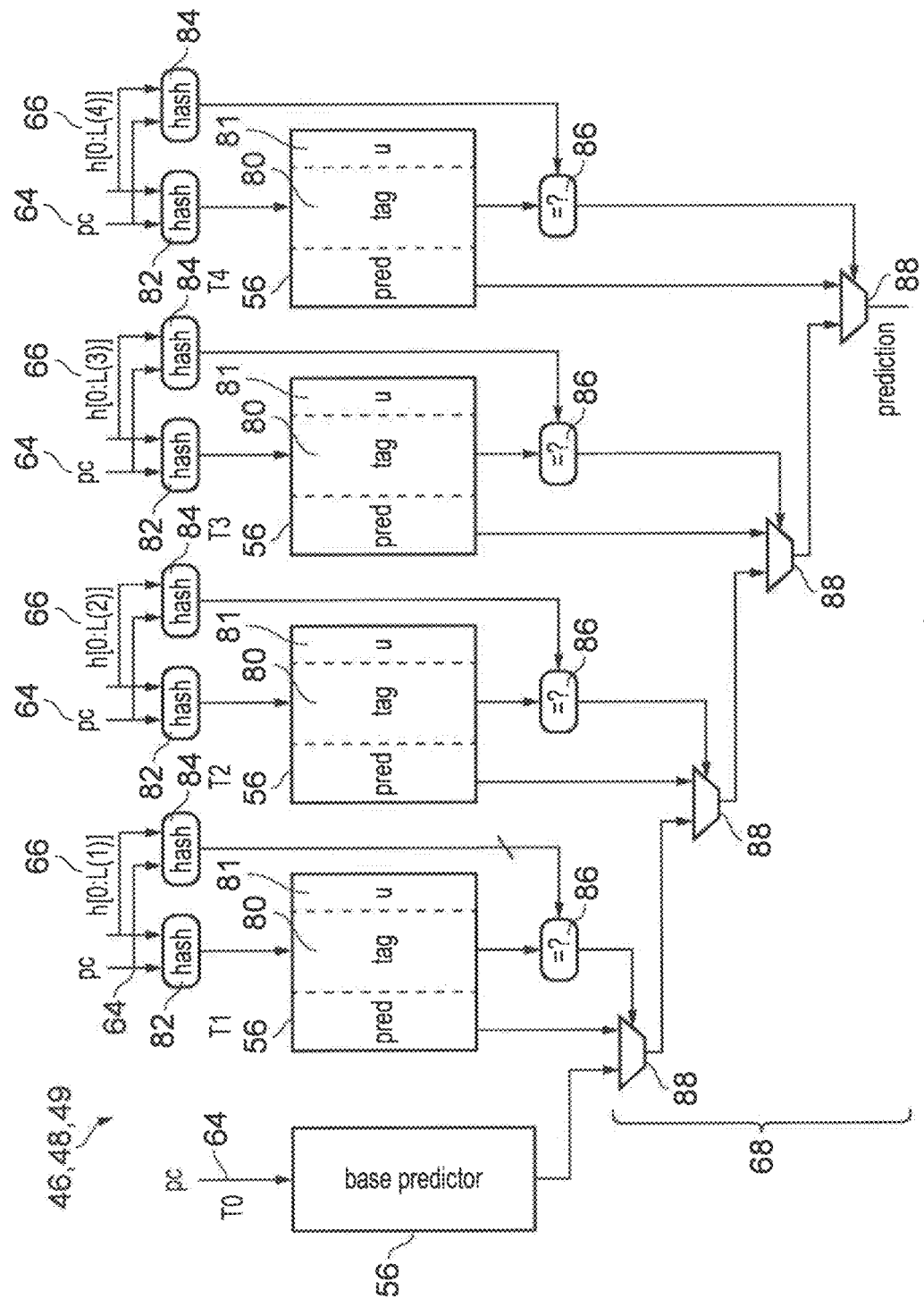
FIG. 4 illustrates an example of a TAGE (tagged geometric) predictor.

FIG. 4 shows in more detail an example structure of the TAGE predictor used for each TAGE predictor 46, 48, 49. The respective predictors 46, 48, 49 use a similar principle to each other, but as explained above differ in the type of history information used to look up the predictor. Each TAGE predictor 46, 48, 49 comprises a number of branch prediction tables 56, comprising a base prediction table T0 and a number of tagged-geometric (TAGE) tables T1 to T4. While this example shows 4 TAGE tables for conciseness, it will be appreciated that the TAGE predictors could be provided with a larger number of tables if desired, e.g. 8 or 16. The predictors 46, 48, 49 could each comprise the same number of branch prediction tables 56, or could comprise different numbers of branch prediction tables 56.

The base predictor T0 is looked up based on the program counter PC alone, while the TAGE tables T1 to T4 are looked up based on a hash value generated by applying hashing circuitry 84 to the PC 64 and successively increasing lengths of history information 66 (e.g. global history for TAGE0 46, local history information for TAGE1 48 and other types of history information for TAGEn 49). Hence, TAGE table T1 uses a shorter sequence of history information compared to T2; T2 uses a shorter sequence of history information compared to T3; and so on. In this example, T4 is the table which uses the longest sequence of history information (although in practice, more than 4 TAGE tables could be provided). For example, T1 could use the newest x entries of the history register, T2 could use the newest y entries of the history register (y>x), and so on.

Each prediction entry of a given branch prediction table 56 (such as a TAGE table) specifies a prediction counter ("pred"), for example a 2-bit counter which provides a bimodal indication of whether the prediction is to be taken or not taken (e.g. counter values 11, 10, 00, 01 may respectively indicate predictions of: strongly predicted taken, weakly predicted taken, weakly predicted not taken, and strongly predicted not taken). Hence, the prediction counter can also be seen to provide an indication of prediction confidence, as well as branch direction.

Each entry also specifies a tag value 80 which is compared, during a lookup, with a tag hash generated by applying hashing circuitry 84 to the lookup information (PC 64 and history information 66) to detect whether the entry corresponds to the current block being looked up (the tag distinguishes between multiple blocks whose index hash values alias onto the same entry of the table). Lookup circuitry for the TAGE predictor includes index hashing circuitry 82 for generating (based on the PC 64 and history information 66) an index hash for indexing into one or more selected entries of the table, hashing circuitry 84 for generating (based on the PC 64 and history information 66) a tag hash value to be written to a newly allocated entry or for comparing with an existing entry's tag value 80 on a lookup, and comparison circuitry 86 for comparing the tag value 80 read out from a looked up entry (or entries) with the calculated tag hash generated by the hashing circuitry 84 to determine whether a hit has been detected.

For a TAGE predictor, TAGE prediction generating circuitry 68 comprises a cascaded sequence of selection multiplexers 88 which select between the alternative predictions returned by any of the branch prediction tables 56 which generate a hit. The base predictor may always be considered to generate a hit, and is used as a fall-back predictor in case none of the other TAGE tables generate a hit (a hit occurs when the tag in the looked up entry matches the tag hash generated based on the indexing information). The cascaded multiplexers are such that if the table T4 looked up using the longest sequence of history generates a hit then its prediction will be output as the prediction result, but if T4 misses then if the preceding table T3 generates a hit then the T3 prediction will be output as the overall prediction for the current block, and so on, so that the prediction which gets selected is the prediction output by the table (among those tables which generated a hit) which corresponds to the longest sequence of history considered in the index/tag generation. That is, any tables which miss are excluded from the selection, and among the remaining tables the one with the longest sequence of history 66 in its lookup information is selected, and if none of the TAGE tables T1 to T4 generate a hit then the prediction made by the base predictor T0 is selected.

When a branch is resolved, the TAGE tables are updated based on the actual branch direction of the branch and whether there was a misprediction. The PC and branch history is used to select a corresponding entry, and prediction confidence is increased on a correct prediction and decreased on a misprediction. If a misprediction was based on an entry that was not in the table T4 looked up based on longest history, a new entry may be allocated in a table looked up with longer history. Each entry of the TAGE tables includes a "usefulness" counter 81 which is used for controlling entry replacement. For example, the usefulness counter can be set to an initial value when allocating a new entry to the table, reset to the initial value when the entry is used to make a prediction, and otherwise periodically decremented. The usefulness counters are used on allocation of new entries to determine whether a given existing entry should be replaced (e.g. the replacement may favour selecting entries with a low "usefulness" value, e.g. those entries that have not been used to make a prediction for a long time).

The TAGE approach is extremely useful for providing high performance because a single table indexed with a fixed length of branch history would have to trade off the accuracy of predictions against the likelihood of lookups hitting in the table. A table indexed with a relatively short sequence of branch history may be more likely to generate a hit, because it is more likely that the recently seen history leading to the current block is the same as a previously seen sequence of history for which an entry is recorded in the table, but as the shorter sequence of history cannot distinguish as precisely between the different routes by which the program flow may have reached the current block, it is more likely that the prediction indicated in the hit entry may be incorrect. On the other hand, for the table T4 which is indexed based on the longest sequence of history, this can be extremely useful for predicting harder to predict branches which need to delve further into the past in terms of exploring the history so that that the pattern of program execution which led to that branch can be characterised and an accurate prediction made, however, it is less likely on subsequent occasions that the longer sequence of history will exactly match the sequence of history leading up to the current block and so the hit rate is lower in a table indexed based on a longer sequence of history. By providing a set of tables with different lengths of history used for look up, this can balance these factors so that while the hardest to predict branches which would be difficult to predict using other branch predictors can be successfully predicted with the longer table T4, other easier to predict branches which do not require the full prediction capability of T4 can be predicted using one of the earlier tables indexed based on shorter history so that it is more likely that a hit will be detected on a prediction lookup, thus increasing the percentage of branches for which a successful prediction can be made and therefore improving prediction accuracy and performance. Hence, TAGE predictors are one of the most accurate predictors known.

However, a single TAGE predictor looked up with a given set of lookup information (e.g. PC, GHR only) still cannot predict all scenarios. For example, a general history based TAGE predictor might predict some fraction of branches well (e.g. 95-97%), but that still leaves a few percent of branches that are mispredicted by the general predictor. Therefore, the combination of a general predictor with a more specialised predictor (such as the LHR based predictor TAGE1 48) can provide even higher prediction accuracy. In particular, it has been found in the Championship of Branch Prediction (CBP) that a multi-TAGE system as shown in FIG. 2 can provide top of the class branch prediction accuracy.

Figure 5:
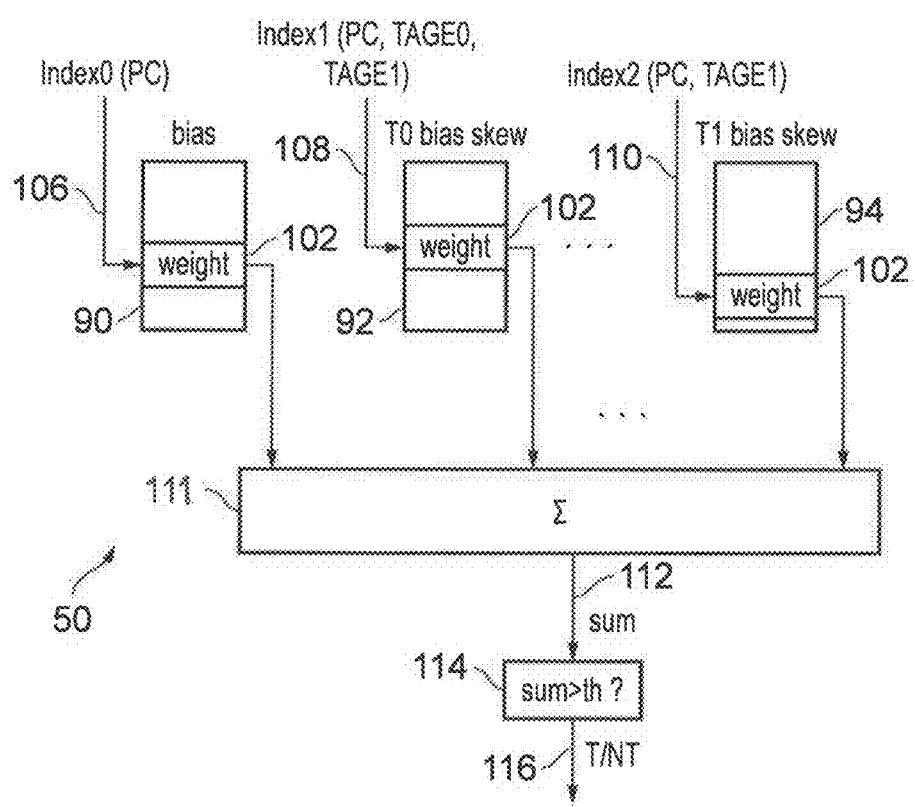
FIG. 5 illustrates an example of use of a perceptron function as the combination function provided by the combiner circuitry, based on untagged tables of prediction state.

However, this leads to complexity in implementing the combiner circuitry 50 which combines the predictions from more than one predictor 46, 48, 49 to form a combined prediction used to control a speculative action based on the individual predictions made by each predictor 46, 48 (for a branch predictor, the speculative action is fetching of subsequent instructions beyond the branch). FIG. 5 shows an example of the combination function applied by the combiner circuitry 50. In this example, the combiner circuitry 50 is a perceptron predictor implementing a perceptron function as the combination function. The combiner circuitry includes a number of perceptron weight tables 90, 92, 94 with entries indexed based on different subsets of indexing information 106, 108, 110. In this example, these weight tables include a bias table 90 for which the corresponding indexing information 106 is derived from the PC address, a T0 bias skew table 92 for which the indexing information 108 is derived from the PC and prediction information provided by TAGE0 46 (and optionally also based on information provided by TAGE1 48), and a T1 (TAGE1) bias skew table 94 for which the indexing information 110 is derived from the PC and prediction information provided by TAGE1 48. In this example, the further predictor 49 is not used, but other examples could also have at least one weight table which depends on prediction information provided by TAGEn 49. Regardless of the particular indexing scheme used for each weight table, in general the index for each weight table can be derived from one or more of the sets of prediction information generated by the respective predictors (with different weight tables corresponding to different combinations of prediction information from the respective predictors). Each of the predictors 46, 48, 49 whose output is being combined may have its prediction information used in generating the index for at least one weight table.

Each of the weight tables 90, 92, 94 comprises a number of entries each providing a weight value 102, and the weights read from the looked up entries (selected based on the respective index) in each of the tables 90, 92, 94 are added together by adding circuitry 111 to produce a sum value 112 which can then be compared with a threshold by comparison circuitry 114 to provide the combined prediction information 116, which indicates for example whether the branch is predicted taken or not taken. Hence, rather than making a cascaded selection between the alternative predictions provided by each table (as is done by the TAGE predictors), a perceptron adds the weights from each of the tables together and the total of all of the weights is thresholded to predict whether the prediction is taken or not taken (also the magnitude of the sum can be an indication of confidence in the prediction).

Using a perceptron as the combiner circuitry 50 can provide good prediction accuracy as the perceptron is well adapted to bringing together a number of distinct pieces of prediction information and can scale to any number of predictors. Also, perceptron update functions are well known for adapting the weights to resolved prediction outcomes.

However, implementing a perceptron in a processing pipeline requiring relatively high prediction bandwidth (high number of predictions made per prediction cycle) can be challenging. Firstly, as shown in FIG. 2, if the combiner circuitry 50 is looked up based on the outputs of the predictors 46, 48, 49, then this dependency chain causes extra latency compared to an implementation which uses a single type of prediction. Also, as the perceptron weight tables 90, 92, 94 are tagless structures, it is not possible to read out multiple entries in the same weight table using a single read port (in contrast, with the tagged TAGE tables it is possible to implement the TAGE tables as set-associative structures enabling multiple ways in the same set to be read out with a single read port). Hence, for processing pipelines which require relatively large number of predictions per cycle (e.g. some pipelines may implement as many as 32 predictions per cycle), looking up the perceptron for that number of predictions per cycle would require the number of read ports provided for each weight table to match the number of predictions needed per cycle. Providing 32 read ports for each perceptron weight table may be prohibitive in terms of circuit area and power cost, and so while the multi-TAGE/combiner approach may be theoretically preferred for branch prediction accuracy, the read port requirement has been seen as preventing the multi-TAGE/combiner approach being implementable in a real world circuit when considering available circuit area and power budgets for typical processors. Another issue with use of untagged tables 90, 92, 94 used for the prediction combiner 50 is that they are more prone to aliasing, where entries allocated and maintained for one prediction input address (PC) are used to generate predictions for another prediction input address for which the predicted behaviour represented by that entry may not be correct.

Figure 6:
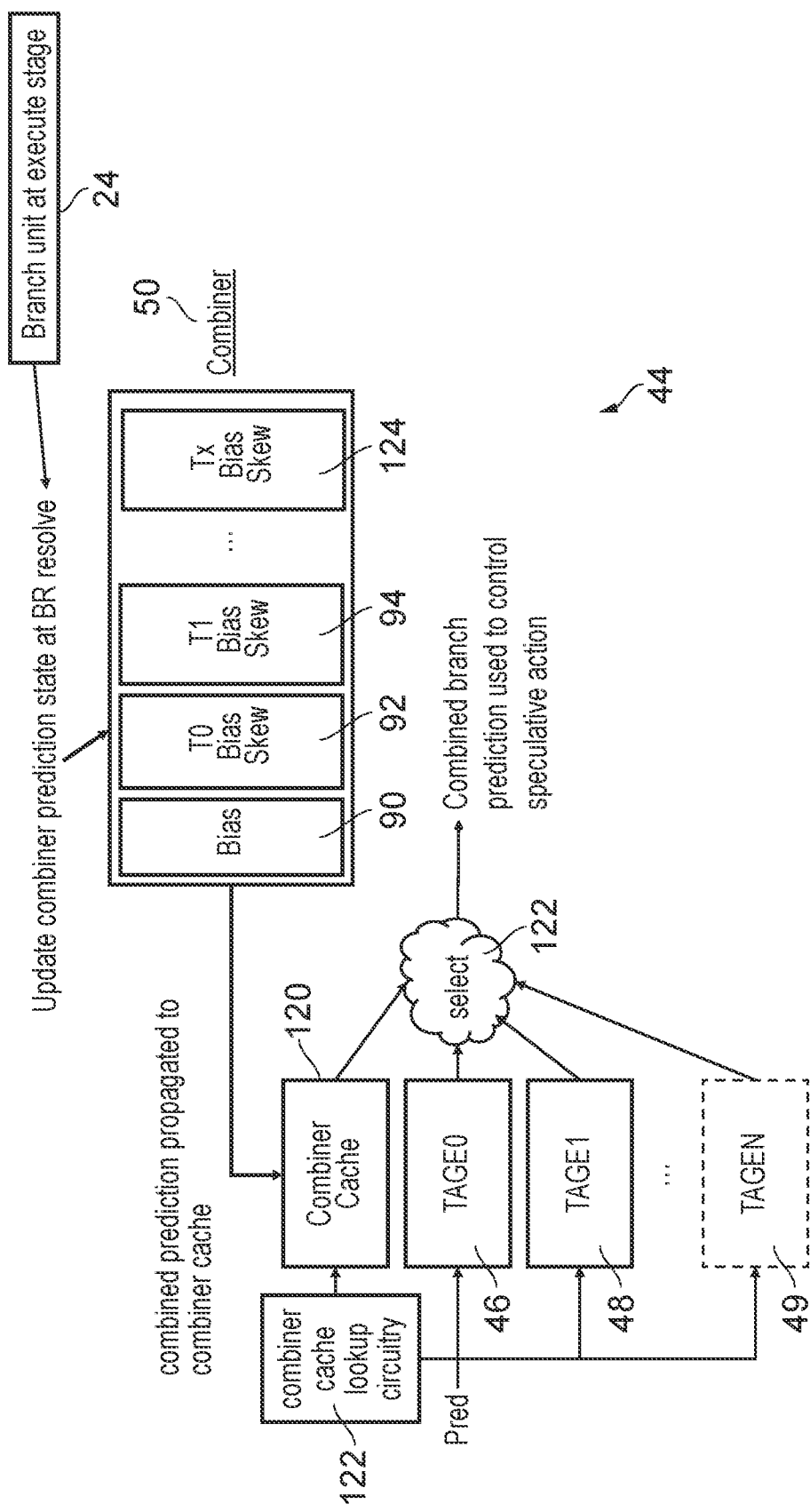
FIG. 6 illustrates an example of prediction circuitry comprising two or more predictors, combiner circuitry, a combiner cache structure, and combiner cache lookup circuitry.

FIG. 6 illustrates another example of prediction circuitry 44 which uses a combiner cache 120 to address these problems with the approach shown in FIG. 2. The prediction circuitry 44 comprises the first predictor 46, second predictor 48 (and optional further predictor 49) and combiner circuitry 50 as in the example discussed above. The combiner circuitry 50 is as in FIG. 5, but as shown in the example of FIG. 6, there could be more than three weight tables 90, 92, 94, e.g. a further bias skew table 124 can be provided to fold in weights looked up based on prediction information from an additional predictor 49. Hence, it will be appreciated that the techniques below can be scaled to different numbers of predictors 46, 48, 49 and weight tables 90, 92, 94, 124.

In the example of FIG. 6, the combiner circuitry 50 is not looked up at prediction time. Instead, the combiner weight tables 90, 92, 94, 124 are updated based on resolved outcomes (e.g. outcomes of branches executed by branch unit 24), and at the time of updating the combiner weight tables 90, 92, 94, 124 one or more combined predictions generated based on the updated prediction state information in the weight tables 90, 92, 94, 124 (e.g. by adding together the updated weights) are propagated to the combiner cache 120 which stores the combined prediction information in an entry corresponding to the address for which the combined predictions were generated.

Figure 7:
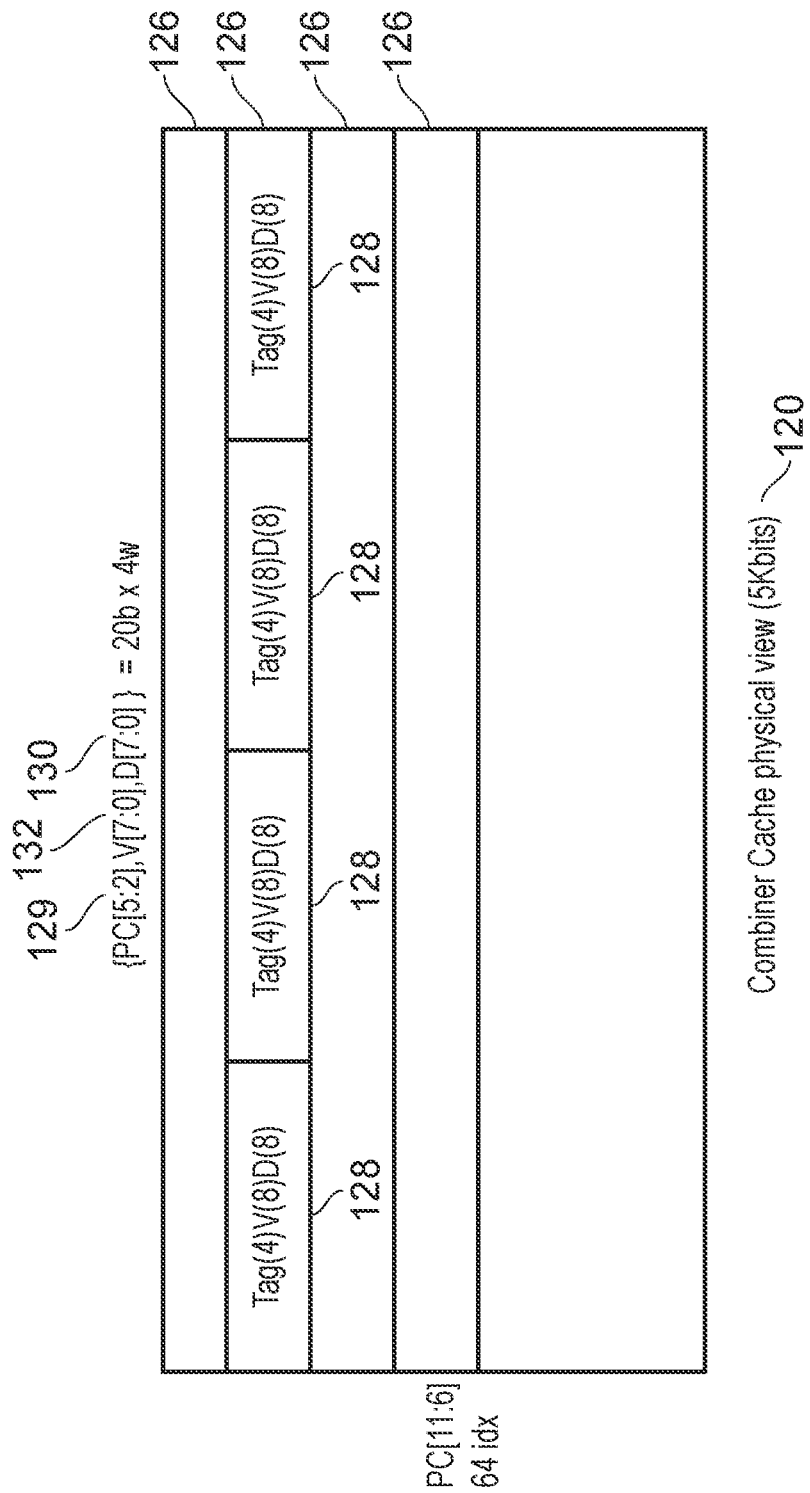
FIG. 7 illustrates an example of the combiner cache structure.

As shown in FIG. 7, the combiner cache 120 has a set-associative cache structure, comprising a number of sets 126 of combiner cache entries, which are indexed based on address information derived from the PC, such as a portion of bits [11:6] of the PC as shown in FIG. 7 (other examples could apply a hash function to a subset of bits of the PC to generate the index and/or fold in other information than the PC for generating the index). Each set 126 comprises two or more combiner cache entries 128 (in this example, the cache 120 is four-way set-associative and so there are four combiner cache entries 128 per set 126).

Figure 8:
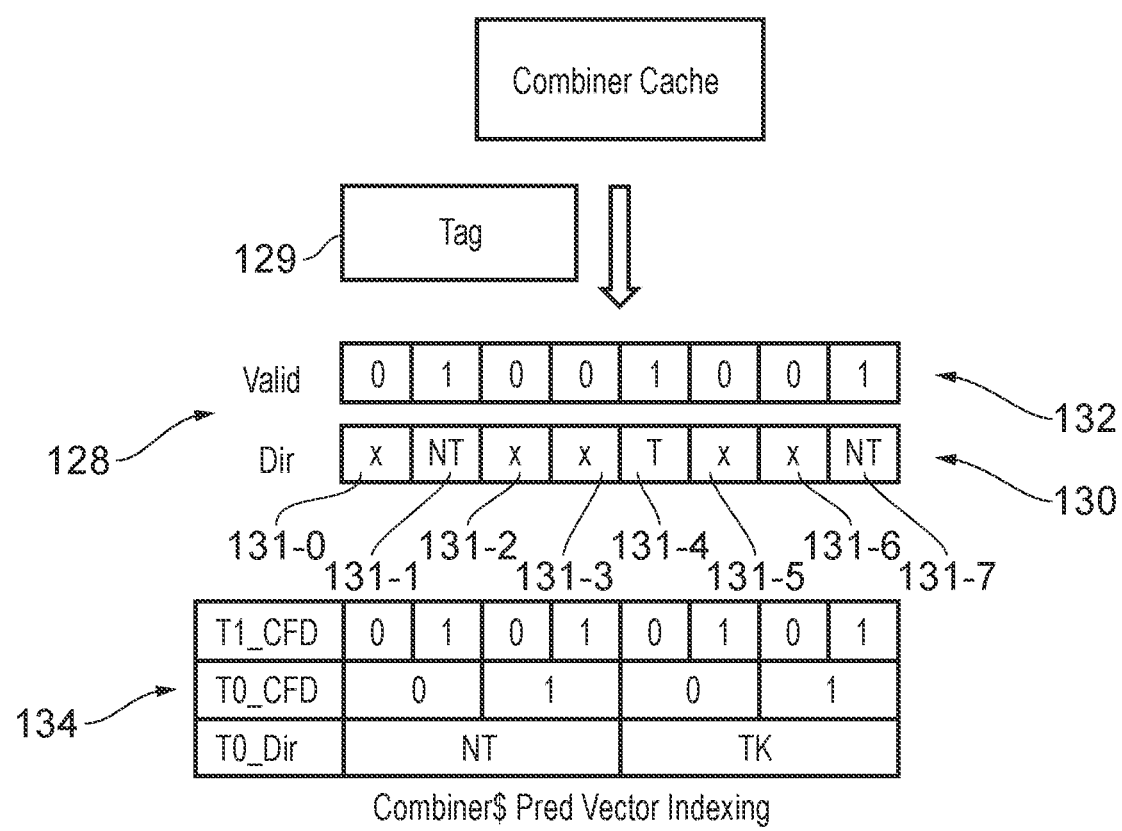
FIG. 8 illustrates an example of a combiner cache entry, and use of prediction information generated by first and second predictors for selecting between items of combined prediction information specified by the combiner cache entry.

As shown in FIGS. 7 and 8, each combiner cache entry 128 includes a tag value 129, a combined prediction vector 130 (in this specific example, referred to as a "direction vector" as it indicates a set of predicted taken/not-taken directions) and a valid vector 132.

The tag value is derived from a portion of the PC (e.g. using bits [5:2] of the PC as shown in FIG. 7—again the extracted subset of bits could be used directly, or have a hash function applied, and/or be combined with other lookup information to form the tag value). On a lookup to the combiner cache, combiner cache lookup circuitry 122 (shown in FIG. 6) reads out the set 126 of entries selected based on the index derived from the PC and compares the tag values 129 of those entries with a corresponding tag value derived from the PC, and if any of the read out tags match, then a hit is detected and that entry is used to determine the combined prediction. If none of the read out tags match, a miss is detected.

Hence, each entry 128 of the combiner cache 120 can be considered to be associated with a corresponding address indication, the address indication comprising the combination of the index associated with the corresponding set 126 and the tag value 129 stored in that entry 128. It will be appreciated that there could also be other ways of associating address information with specific entries (e.g. a fully associative cache (in which case there is no index and all bits of the address indication are comprised by the tag)).

The combined prediction vector 130 of the combiner cache entry 128 specifies a set of combined prediction information items 131, each item specifying the combined prediction (e.g. taken (T) or not-taken (NT)) that would be generated by the combiner circuitry 50 if the combiner circuitry was looked up based on a PC value corresponding to the address indication (combination of index and tag) of that entry 128 and a given combination of values for the respective sets of prediction information generated by the predictors 46, 48, 49. For conciseness, the example of FIG. 8 is based on using prediction information from just two predictors 46, 48, but if there are more than two predictors being combined, items 131 of combined prediction information can be provided for each possible outcome of prediction information from two or more predictors. Most of these items 131 will be irrelevant for any given lookup of the combiner cache, as the combiner cache lookup circuitry 122 will select between the items of combined prediction information depending on the actual outputs made by the predictors 46, 48, 49 when generating a prediction for a specific prediction input address, but nevertheless it is useful to store pre-computed outcomes of the combiner circuitry 50 associated with different possible combinations of the possible values for the respective sets of prediction information, as this allows the combiner cache 120 to be looked up based on the prediction input address (PC) alone, so that the lookup of the combiner cache 120 does not need to be dependent on the predictors 46, 48, 49 already having generated their predictions. This reduces the latency associated with making the prediction, as the combiner cache lookup can be performed in parallel with, or ahead of, completing the lookup to the first predictor 46 and/or second predictor 48. The valid vector 132 specifies, for each of the items of combined prediction information specified in the combined prediction vector 130, whether the corresponding item of combined prediction information is valid.

The table 134 in FIG. 8 shows the indexing scheme used to select which item 131 to use from the combined prediction vector 130 for forming the combined prediction which is actually used to control the speculative action (e.g. fetching of instructions by the fetch stage 6). This table 134 is shown for information and is not part of the stored combiner cache entry 128 itself. In this example, the information used to control the selection includes: first prediction information generated by the first predictor 46, comprising a first confidence value T0_CFD and a first direction value T0_Dir, and second prediction information 49 from the second predictor 48, comprising a second confidence value T1_CFD. For example, for a TAGE lookup, the direction and confidence indications could correspond to the two-bit bimodal counter read from the relevant branch prediction table 56 (e.g. TAGE table) which generated the hit for the longest length of history.

Hence, for example, in FIG. 8, item 131-0 will be selected when T0_CFD=0, T0_Dir=not taken (NT), and T1_CFD=0; item 131-1 will be selected when T0_CFD=0, T0_Dir=not taken (NT), and T1_CFD=1; item 131-2 will be selected when T0_CFD=1, T0_Dir=not taken (NT), and T1_CFD=0; and so on for the other items.

In this example, the second predictor's 48 direction prediction T1_Dir is not used for indexing of the combined prediction vector 130, because an allocation policy is used where a new entry is allocated to the combiner cache 120 only for entries which would provide at least one combined prediction item 131 which would provide a different prediction outcome to the prediction T0_Dir which would be made by the first predictor 46 in order for that item 131 of prediction state to be selected. For example, for item 131-0, that item would not be newly allocated as valid if the prediction indicated by item 131-0 is not-taken (matching the NT outcome which would have to be indicated by T0_Dir in order for item 131-0 to be selected to form the combined prediction). Similarly, for an item 131-7 corresponding to {T0_Dir=taken (TK), T0_CFD=1, T1_CFD=1}, that item would not be newly allocated as valid if the prediction indicated by item 131-7 is taken (matching the TK outcome which would be indicated by T0_Dir if item 131-7 is actually to be used for forming a prediction).

As shown in FIG. 8, it is nevertheless possible for an item 131-1 to specify the same prediction outcome as the outcome of T0_Dir which would lead to its selection for forming a prediction (here 131-1 indicates NT and NT is the outcome of T0_Dir for item 131-1 to be selected). This is because, while item 131-1 would initially have been allocated to indicate a TK prediction opposite to the associated T0_Dir prediction for that item, subsequent changes in behaviour of branches resolved by the branch unit 24 would have caused updates to the weights used by the combiner circuitry 50, so that the combined prediction output by combiner circuitry 50 for the corresponding set of prediction inputs {T0_Dir=NT, T0_CFD=0, T1_CFD=1} changed to NT and this updated prediction was propagated through to the corresponding item of prediction state 131-1 in the combiner cache. Therefore, it is still possible that a valid item 131 of combined prediction information may indicate the same outcome as the value of T0_Dir that would cause that item 131 to be selected.

Nevertheless, in the most typical case when an entry is allocated, the T1_Dir prediction would be the opposite from the T0_Dir prediction, so generally the T1_Dir prediction does not give additional information compared to the T0_Dir prediction, and so T0_Dir itself can be enough to select the combined prediction information. By eliminating T1_Dir from the set of prediction information used to select between the combined information items 131, this means fewer items 131 can be provided (e.g. the number of bits of prediction state used for selection becomes 3 instead of 4, allowing the prediction vector 130 and valid vector 132 to become 8 bits instead of 16, and thus incurring half the storage cost).

This allocation policy recognises that for the majority of branches, the TAGE0 predictor based on global history may be sufficient to adequately predict the branch outcome, and so it is only on the minority of predictions that TAGE0 is incorrect and the more specific TAGE1 prediction based on filtered local history can provide a better outcome. By restricting allocation into the combiner cache 120 to predictions where the combined prediction based on TAGE0, TAGE1 (or other predictors) would override the TAGE0 prediction that would need to be made for that combined prediction item 131 to be selected, a smaller cache structure can be used for the combiner cache 120 as for a given number of branches to be predicted per cycle (e.g. 32), it will be expected that most of these will give the same outcome as the corresponding TAGE0 prediction for all possible values of T0_Dir, T0_CFD, T1_CFD, and so the number of branches requiring combiner cache entries can be much lower while still maintaining the required lookup bandwidth. For example, as shown in FIG. 7 a 4-way set-associative structure (providing a maximum of 4 looked up entries per read port) can be sufficient to give adequate predictions for a 32-branch per cycle lookup. Therefore, the circuit area/ power cost of the combiner cache can be much lower than the cost that would have been incurred if the combiner circuitry 50 itself had to be looked up on every cycle. Another benefit of an allocation policy in which new entries are not allocated (and specific items 131 of combined prediction information are not valid) unless they would provide a different prediction to the outcome for T0_Dir used for indexing that item 131, is that this reduces pollution of the combiner cache information by aliasing, since a lookup for one address is less likely to hit against combined prediction information allocated for another address in the same lookup block for which the combination of index/tag maps to the same entry. Hence, this allocation policy can also help improve performance.

In the example of FIG. 7, the tag comprises 4 bits, and the direction vector 130 and valid vector 132 comprise 8 bits each. However, it will be appreciated that the tag size can vary depending on the indexing/tagging scheme chosen for accessing the combiner cache. In particular, it can be useful if the entries in the combiner cache 120 are allocated for address blocks of the same size as the granularity at which the combiner cache 50 allocates entries, so that accesses that would hit against the same set of weights in the combiner tables 90, 92, 94, 124 would also hit against the same entry in the combiner cache 120. Similarly, the size of the direction vector 130 and valid vector 132 depend on how many bits of prediction information are used to select between the alternative combined predictions for each alternative outcome of the prediction information. In the example of FIG. 8, 3 bits of first/second prediction information are used to select between the alternative predictions indicated in a given combiner cache entry, and so there are $2^3=8$ possible outcomes for those 3 bits of state, and therefore 8 bits are provided in each of the direction vector 130 and valid vector 132, to record a combined prediction for each outcome. However, more generally if N bits of prediction information were used to track each possible outcome of the first/second predictor's predictions, then 2N bits could be provided for each of the direction vector 130 and valid vector 132 (assuming the combined predicted outcome can be indicated with a single bit, such as 1 bit indicating the taken/not-taken outcome as shown in FIG. 7). If the combiner cache was used for a type of prediction where the predicted outcome can take more than two outcomes, then each item of combined prediction information in the prediction vector 130 could comprise 2 or more bits. Therefore, the total size of the combined prediction vector 130 could be $X*2^N$ bits, where X is the number of bits used to express the combined prediction for a single item 131 of combined prediction information, and N is the number of bits of prediction information from two or more predictors used to select between the items 131 of combined prediction information.

Figure 9:
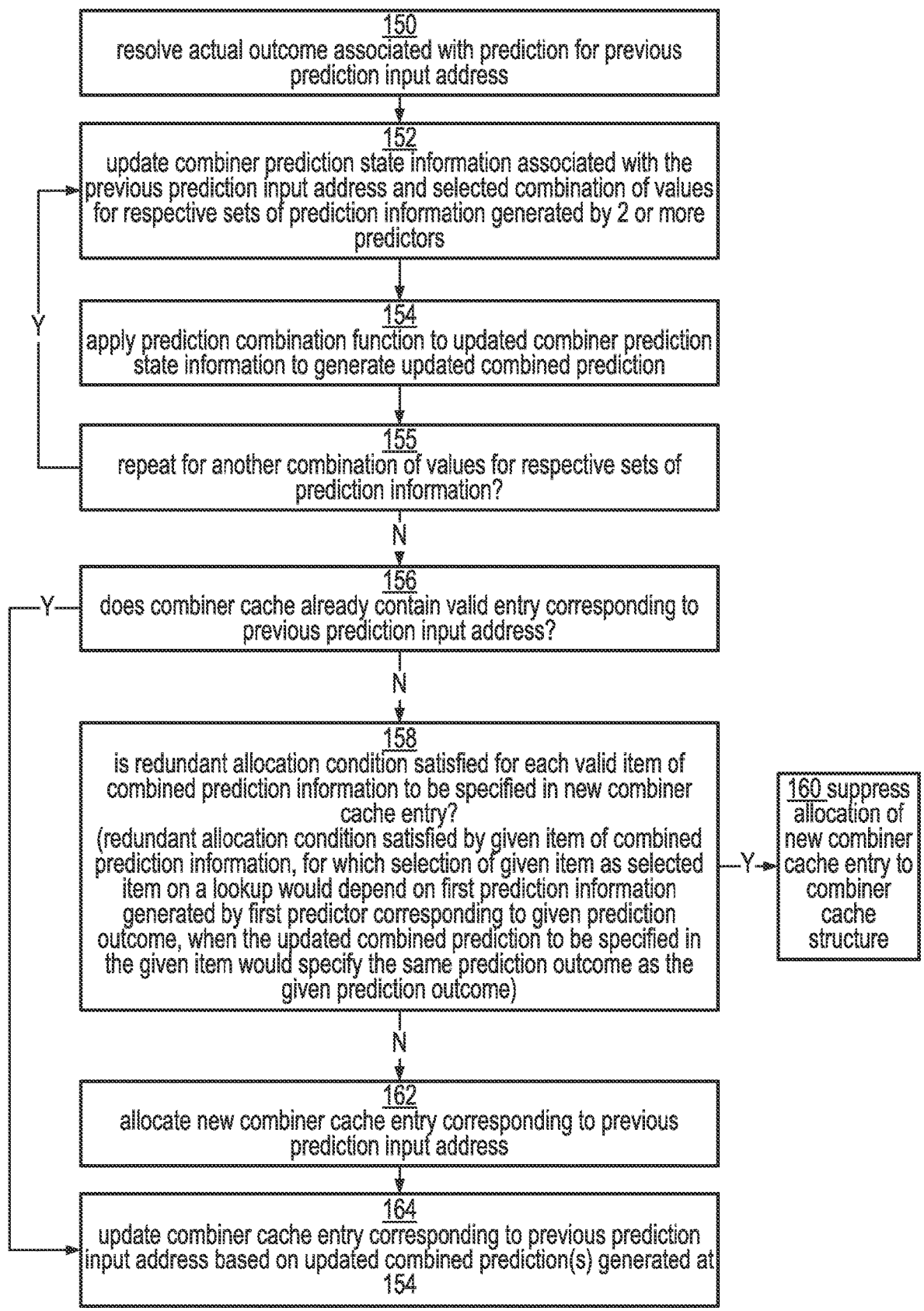
FIG. 9 is a flow diagram illustrating steps for updating the combiner prediction state information used by the combiner circuitry and updating the combiner cache structure based on the updated combiner prediction state information.

FIG. 9 is a flow diagram showing a method of updating the combiner cache based on resolved outcomes. At step 150, the processing circuitry resolves an actual outcome associated with the prediction for a previous prediction input address. For example, the branch unit 24 resolves whether an executed branch instruction associated with a given PC address generated a taken or not-taken outcome.

At step 152, the combiner circuitry 50 updates its combiner prediction state information associated with the previous prediction input address and a selected combination of values for respective sets of prediction information predicted by the two or more predictors 46, 48, 49. Any known perceptron updating function may be used to determine the updated weights 102 following the update. In some cases, the determination of how to update the weights 102 may depend not only on the resolved outcome for the executed instruction, but also on the predicted outcome that would have been predicted by the combiner circuitry 50 for the previous prediction input address and the selected combination of values for the respective sets of prediction information. For example, the update may depend on whether there was a misprediction (the actual outcome differed from the predicted outcome), and/or whether the absolute magnitude of the sum of weights obtained by the combiner circuitry 50 (when looked up for the previous prediction input address and the selected combination of values for the respective sets of prediction information) exceeds a threshold. Hence, if information regarding the predicted outcome is used to determine whether to update the weights, the predicted outcome could either be obtained by looking up the combiner circuitry 50 at resolve time, or if that predicted outcome is already available from the prediction phase based on a lookup of the combiner cache 120, the predicted outcome could be held in a buffer since prediction time, ready for use at resolve time for determining how to update the weights.

At step 154, the combiner circuitry applies the prediction combination function (e.g. the sum of weights and threshold applied by circuitry 110, 114) to the updated combiner prediction state information to generate an updated combined prediction corresponding to the previous prediction input address and the selected combination of values for the respective sets of prediction information generated by the predictors 46, 48, 49 whose predictions are being combined by the combiner circuitry 50.

At step 155, combiner circuitry 50 determines whether to repeat the prediction update phase for another combination of values for the respective sets of prediction information. If so, then steps 152 and 154 are repeated for that other combination of values. Different implementations may vary, depending on implementation design choice, how many different combinations of values for the respective predictor's prediction information are scrubbed to check for updates based on the actual resolved outcome. Some examples may perform an update only for the specific combination of values of prediction information that was previously predicted by the predictors 46, 48, 49 when the previous prediction was made for the previous prediction input address. In this case, an indication of those specific combinations of values previously predicted by predictors 46, 48, 49 at prediction time could be recorded in a buffer at prediction time, for use at resolution time in selecting which combinations of values of prediction information should have their respective weights updated. Alternatively, one or more of the predictors 46, 48, 49 could be looked up again at resolution time to obtain the corresponding values of the respective sets of prediction information for use in determining which weights to update at resolution time.

Other examples could also perform combiner weight updates for one or more other combinations of values of predicted prediction information from the predictors 46, 48, 49, other than the specific combination of values which was predicted at the time when the previous prediction was made for the previous prediction input address. Some implementations could scrub every combination of possible values for the prediction inputs used for combiner circuitry lookup, and perform the weight update steps 152, 154 for every combination of values. Other approaches could select just a subset of the possible combinations of prediction information for having their corresponding weights updated. Which subset of combinations of values of prediction information has the corresponding set of weights updated could vary from one lookup to another (e.g. if there is bandwidth for handling only a certain number of updates per resolution cycle, a round robin function could be used to select which specific combinations of prediction inputs to the combiner circuitry are used to update the weights on a given resolution cycle).

Hence, there can be considerable scope for varying the particular way in which updates to the prediction state 90, 92, 94, 124 used by combiner circuitry 50 are implemented, but in general an update is made to the prediction state recorded by combiner circuitry 50 for the combination of the previous prediction input address and at least one selected combination of values for the respective sets of prediction information from the predictors 46, 48, 49 that would be used as lookup information to the combiner circuitry 50.

Once there are no more combinations of values of prediction information for which updates are to be performed in the combiner circuitry 50 weight tables, at step 156 the combiner circuitry 50 controls the combiner cache lookup circuitry 122 to look up the combiner cache 120 to determine whether there is already a valid combiner cache entry corresponding to the previous prediction input address (alternatively, an indication of whether there is a valid combiner cache entry could have been recorded in a buffer at prediction time based on a lookup of the combiner cache performed for the previous prediction input address when the previous prediction was generated). If there is no valid entry corresponding to the previous prediction input address in the combiner cache 120, then a new entry would need to be allocated to allow combined prediction information to be recorded in the combiner cache associated with the previous prediction input address. At step 158, the combiner circuitry 50 determines whether a redundant allocation condition is satisfied for each valid item of combined prediction information that would be specified in the new combiner cache entry. The redundant allocation condition is satisfied by a given item 131 of combined prediction information if it would specify the same prediction outcome as a given prediction outcome which would be generated by the first predictor 46 in a case where the first prediction information generated by the first predictor 46 has a given value which would be needed in order for the given item 131 to be selected for generating the combined prediction at prediction time.

For example, in the example of FIG. 8, items 131-0, 131-1, 131-2, 131-3 would all satisfy the redundant allocation condition if they indicate a NT prediction, as this matches the value of T0_Dir which would be needed if any of these items were to be selected for generating a combined prediction (if T0_Dir was TK, then none of 131-0, 131-1, 131-2, 131-3 is relevant as they would not be selected). Hence, for items 131-0, 131-1, 131-2, 131-3, these would not satisfy the redundant allocation condition if their direction prediction is TK. Similarly, items 131-4 to 131-7 shown in FIG. 8 would satisfy the redundant allocation condition if they indicates a TK prediction, and would not satisfy the redundant allocation condition if they indicates a NT prediction.

By applying this allocation filtering condition, this can avoid using up a combiner cache entry 128 which would merely indicate exactly the same prediction outcomes as would be generated by the TAGE0 predictor 46 for each possible outcome of the lookup information {T0_Dir, T0_CFD, T1_CFD}.

Hence, if the redundant allocation condition would be satisfied for each valid item of combined prediction information to be specified by the new combiner cache entry, then at step 160 allocation of the new combiner cache entry into the combiner cache structure 120 is suppressed. Hence, there is no need for a combiner cache update in this instance. In practice, a significant fraction of combiner cache allocations can be filtered out at this step, preserving capacity for the rarer occasions when the combined predictions would have given a different outcome to the outcome predicted by the first predictor 46.

On the other hand, if the redundant allocation condition is not satisfied by each valid item of combined prediction information to be specified in the new combiner cache entry, then at step 162, the combiner cache 120 allocates a new entry corresponds the previous prediction input address. Any known victim selection technique can be used to select which entry is replaced with the newly allocated entry, e.g. round robin or least recently used victim selection algorithms could be used. In some cases, the combiner cache 120 may preferentially select an existing entry for eviction if all its valid items 131 of combined prediction information meet the redundant allocation condition (while such an entry would not initially have been allocated in this state due to the filtering at steps 158, 160, subsequent updates once already allocated could result in all valid items 131 meeting the redundant allocation condition).

At step 164, regardless of whether a new combiner cache entry was allocated for the previous prediction input address or the previous prediction input address hit against an existing entry, the combiner cache entry corresponding to the previous prediction input address is updated based on the updated combined predictions generated for one or more combinations of values for the respective sets of prediction information at step 155. For example, each combination of values for T0_Dir, T0_CFD, T1_CFD which was subjected to the update function at steps 152, 154, 155 may have its corresponding item 131 of combined prediction information updated based on the combined prediction generated at step 154 (and marked valid in the valid vector 132, if that item 131 was not already valid). Alternatively, items of combined prediction information for which the combined prediction has been updated to the same outcome as the corresponding T0_Dir value leading to selection of that item could be suppressed from being allocated as valid (or if previously indicated as valid, could be invalidated), as in this scenario the prediction by first predictor 46 could be sufficient to indicate the combined prediction.

Figure 10:
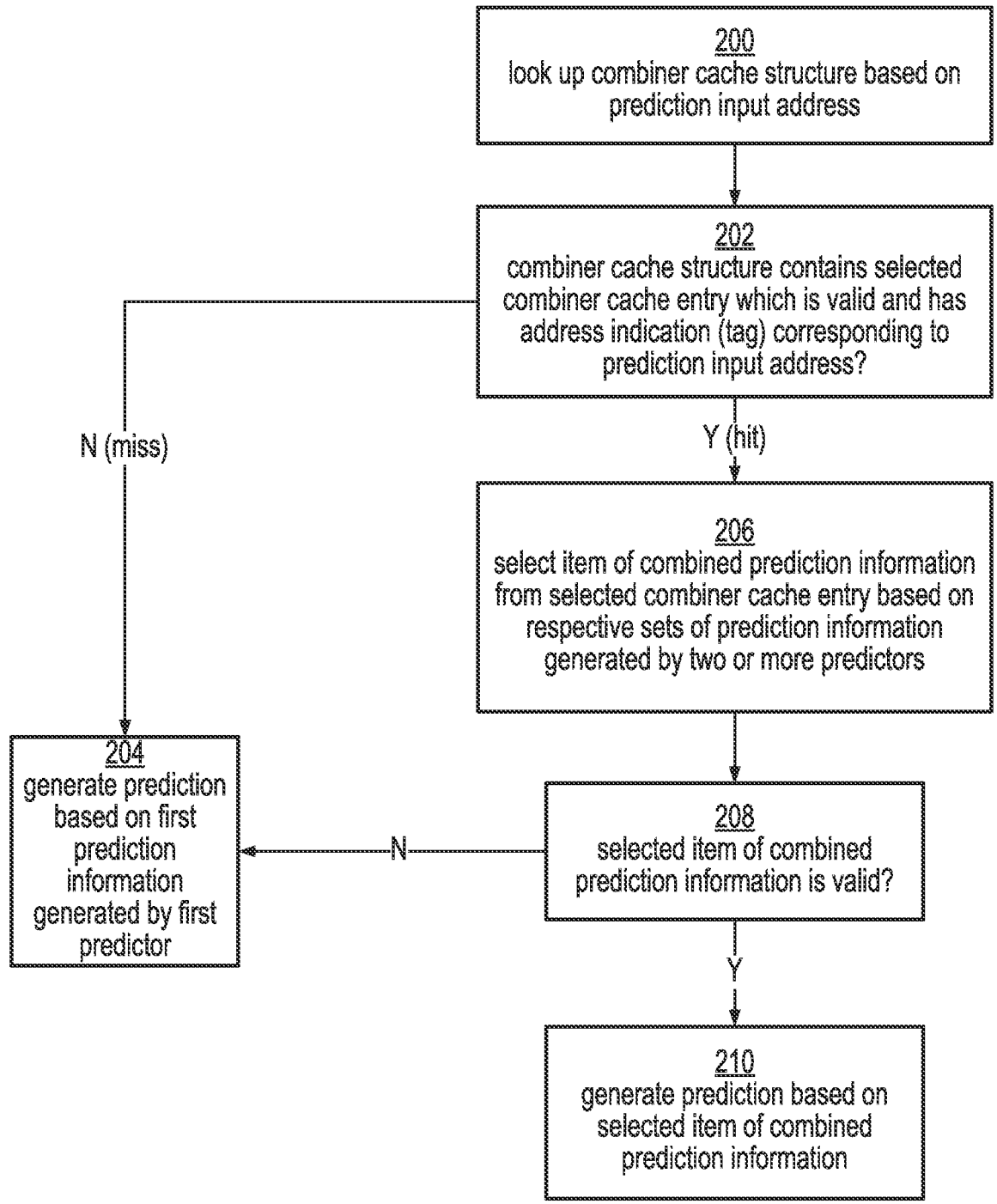
FIG. 10 is a flow diagram illustrating steps for generating a prediction based on a lookup of the combiner cache structure.

FIG. 10 is a flow diagram illustrating a method of using the combiner cache structure 120 to generate a combined prediction associated with the prediction input address. While the method of FIG. 9 is performed at resolution time when an actual outcome is resolved, the method of FIG. 10 is performed at prediction time ahead of the time when the actual outcome becomes known, to allow speculative actions to be performed based on the prediction.

At step 200, combiner cache lookup circuitry 122 looks up the combiner cache structure 120 based on a prediction input address. At step 202, the combiner cache lookup circuitry 122 determines whether the combiner cache structure 120 contains a selected combiner cache entry 128 which is valid and has an address indication (tag) corresponding to the prediction input address. If there is no valid combiner cache entry 128 having a tag corresponding to the prediction input address, then at step 204 a prediction is generated based on first prediction information (e.g. confidence and branch direction) generated by the first predictor 46 (e.g. TAGE0, based on global history information).

If at step 202 a hit is detected in the combiner cache structure 120 for the prediction input address, then at step 206 the combiner cache lookup circuitry 122 selects, from among the items 131 of combined prediction information specified in the selected combiner cache entry 128 having the matching tag, the specific item 131 which corresponds to the specific set of values of the respective sets of prediction information generated by the two or more predictors 46, 48, 49. For example, in a two-predictor example using predictors 46, 48 and the indexing scheme shown in FIG. 8, if the specific predictions made by looking up those predictors 46, 48 indicate T0_Dir=TK, T0_CFD=1, T1_CFD=1, then item 131-7 is selected as the selected item 131 to be used for the corresponding prediction.

At step 208, the combiner cache lookup circuitry 122 determines, from the element of the valid vector 132 corresponding to the selected item 131 whether the selected item is valid and if not, then this is treated the same way as a miss in the combiner cache structure, and so again at step 204 the prediction would be generated based on the first prediction information generated by the first predictor 46.

On the other hand, if the selected item of combined prediction information 131 is valid in the selected combiner cache entry 128, then at step 210 the prediction is generated based on the selected item of combined prediction information (e.g. in the example of FIG. 8, if item 131-7 was the selected item, the prediction generated would be NT as indicated by that item 131-7 in the combined prediction vector 130).

The prediction generated at step 204 or 210 is used as the combined prediction for controlling a speculative action by the processor, such as fetching of instructions beyond a branch instruction.

Figure 11:
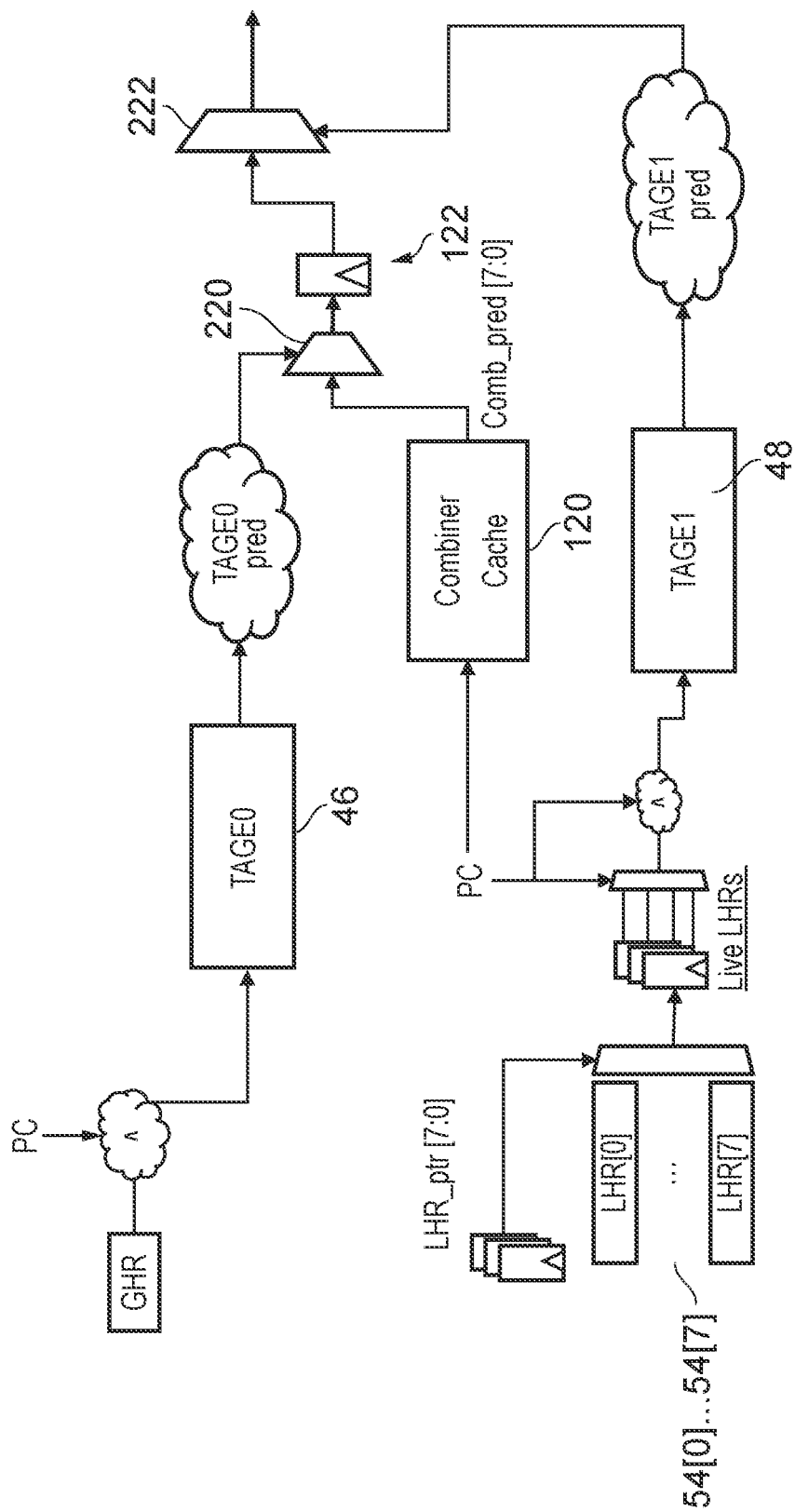
FIG. 11 illustrates an example of the prediction circuitry.

FIG. 11 shows an example of circuitry for looking up the first predictor 46, second predictor 48 and combiner cache 120 at the time of making a prediction for a given prediction input address (PC). As shown in FIG. 11, lookup of the combiner cache 120 may occur ahead of, or in parallel with, lookup of the second predictor (TAGE1) 48 which is looked up based on local history information. This can be advantageous because the lookup to the second predictor 48 may be slower than the lookup to the first predictor 46 due to the added latency of the selection step of selecting which of the LHRs 54[0] . . . 54[7] is to be used based on the prediction input address (PC) (this PC based selection is not required for a predictor looked up based on global history). Also, by allowing the combiner cache 120 and TAGE1 lookups to proceed in parallel, this reduces overall prediction latency compared to an approach where the TAGE1 output is used as a lookup input to the combiner circuitry 50 (as in the example of FIG. 2 which shows the comparative implementation not using the combiner cache 120). Therefore, the approach shown in FIG. 11 can significantly reduce prediction latency.

As shown in FIG. 11, if the first predictor 46 generates its first prediction information at an earlier timing than the second predictor 48 generates its prediction information, the first prediction information from the first predictor 46 can be used by the combiner cache lookup circuitry 122 to preselect a subset of items 131 of combined prediction information at a first stage 220 of selection based on the first prediction information, before subsequently selecting between that subset of items 131 based on the second prediction information (once available from the second predictor 48) at a second stage 222 of selection. For example, with the example of FIG. 8, T0_Dir and T0_CFD can be used at the first selection stage 220 to select a subset of items (e.g. the selected subset of items can be 131-0, 131-1 if T1_Dir=NT and T0_CFD=0), and then at the second stage 222 of selection, T1_CFD from the second predictor 48 can be used to select which of items 131-0, 131-1 can be used. By splitting the selection to stages in this way, the first selection stage 220 can be carried out in parallel with the second predictor 48 generating its second prediction information, so that the depth of the multiplexer at the second selection stage 222 can be reduced (compared to a single stage multiplexer selecting between the full set of items 131 based on both first/second prediction information), and hence the added delay after the second prediction information becomes available can be reduced.

Another advantage of providing the combiner cache 120 is that, as the combiner cache lookup is now decorrelated from the outputs of the individual predictors 46, 48, 49 (unlike the lookup to the combiner circuitry 50 itself), it is not necessary to obtain the output of each individual predictor 46, 48, 49 at prediction time, in order to determine the combined prediction that was pre-computed by combiner circuitry 50 previously based on the outputs of those individual predictor 46, 48, 49. It is also observed that often the global-history based predictor (TAGE0) 46 will be sufficient to give the combined prediction and the combined prediction is unlikely to differ from the prediction made by TAGE0 46. Hence, for a second predictor (e.g. TAGE1 48 or any other predictor 49 using filtered history information gathered for a filtered subset of addresses), there is an opportunity for power saving by suppressing the lookup to that predictor if, based on a power hint extracted from the information in the combiner cache 120, it is determined that a lookup suppression condition is satisfied.

Figure 12:
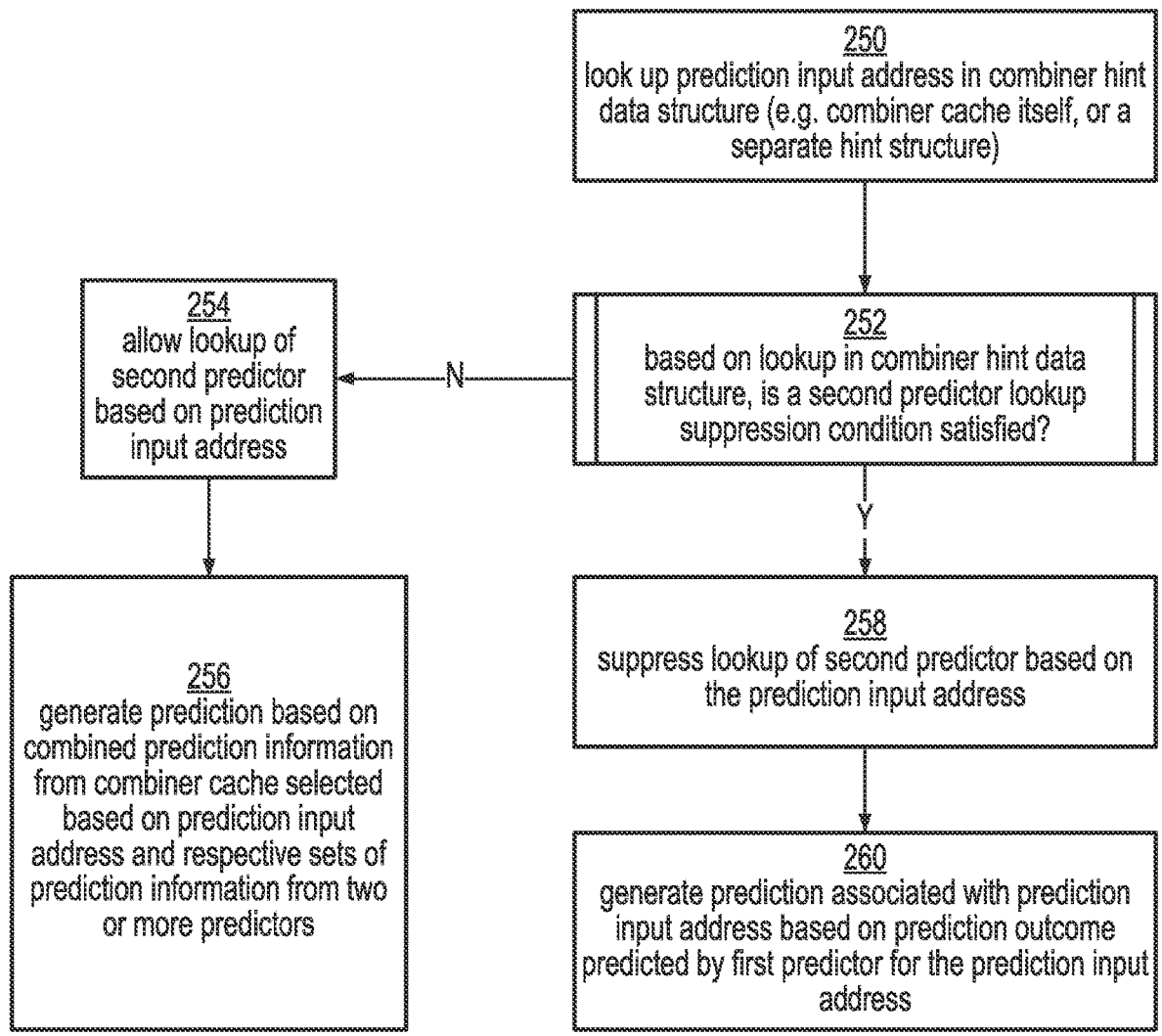
FIG. 12 is a flow diagram illustrating steps for determining whether to suppress a lookup of a second predictor based on a lookup of the prediction input address in a combiner hint data structure.

FIG. 12 shows a flow diagram illustrating a method for determining whether to perform the lookup to the second predictor. In the examples below, the second predictor is TAGE1 48, but the same technique could be applied for any other predictor 49 other than the first predictor 46 whose output is used in the default case where the prediction input address misses in the combiner cache 120.

At step 250, prediction control circuitry (e.g. the combiner cache lookup circuitry 122 mentioned earlier, and/or lookup logic associated with the second predictor 48 as shown below for FIG. 23 or 24) looks up a prediction input address in a combiner hint data structure, which could be the combiner cache 120 itself or could be a hint structure 380 separate from the combiner cache 120 (see the example of FIG. 24 discussed further below). At step 252, the prediction control circuitry determines based on the lookup in the combiner hint data structure 120, 380, whether a second predictor lookup suppression condition is satisfied. As discussed further below, there can be a number of different ways in which the second predictor lookup suppression condition can be evaluated. If the second predictor lookup suppression condition is not satisfied, then at step 254, the prediction control circuitry allows a lookup of the second predictor 48 to proceed based on the prediction input address, and at step 256 the prediction circuitry generates the prediction based on the combined prediction information from the combiner cache 120 selected based on the prediction input address and respective sets of prediction information from the two or more predictors 46, 48, 49.

However, if at step 252 it is determined that the second predictor lookup suppression condition is satisfied for the prediction input address, then at step 258 the lookup of the second predictor 48 based on the prediction input address is suppressed, and at step 260 the prediction associated with the prediction input address can be generated based on the prediction outcome predicted by the first predictor 46 for the prediction input address, without looking up the second predictor 48.

Figure 13:
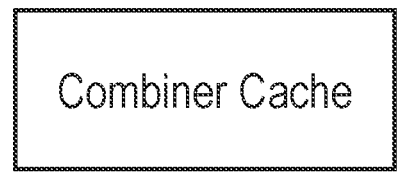
FIGS. 13 and 14 illustrate a first example of determining whether a second predictor lookup suppression condition is satisfied.
Figure 14:
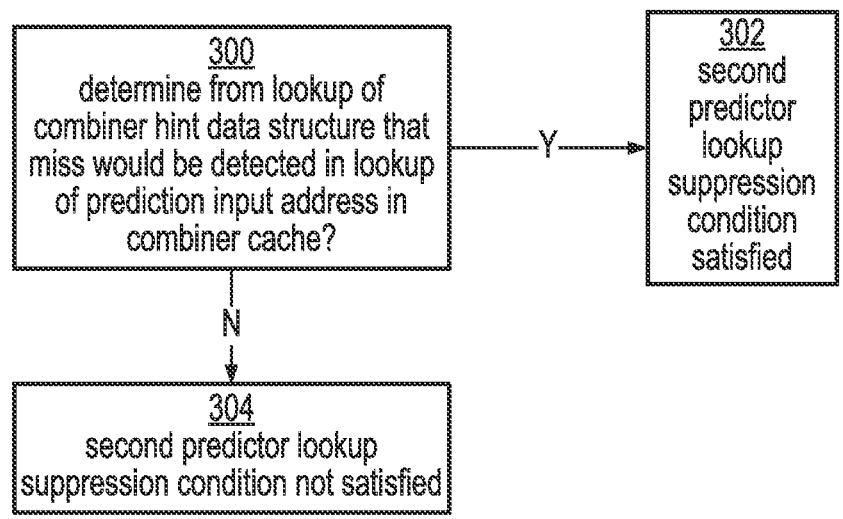

FIGS. 13 and 14 illustrate a first example of determining whether the second predictor lookup suppression condition is satisfied at step 252 of FIG. 12. In this example, if at step 300 of FIG. 14 the prediction control circuitry determines, from the lookup of the combiner hint data structure 120, 380 for the prediction input address, that looking up the combiner cache 120 for the prediction input address would detect a miss (because there is no entry with matching address information (index/tag)), then at step 302 the second predictor lookup suppression is considered satisfied. In this case, it is determined that the lookup of the second predictor 48 is not necessary, since in the case of a miss in the combiner cache 120 the prediction is generated based on the first predictor 46 alone as shown at step 204 of FIG. 10. If the lookup in the combiner hint data structure does not identify that a miss would be detected in the combiner cache 120 for the prediction input address (either because there would be a hit in the combiner cache hundred 20, or because there is no hint information available), then at step 304 the second predictor lookup suppression condition is considered not satisfied.

Figure 15:
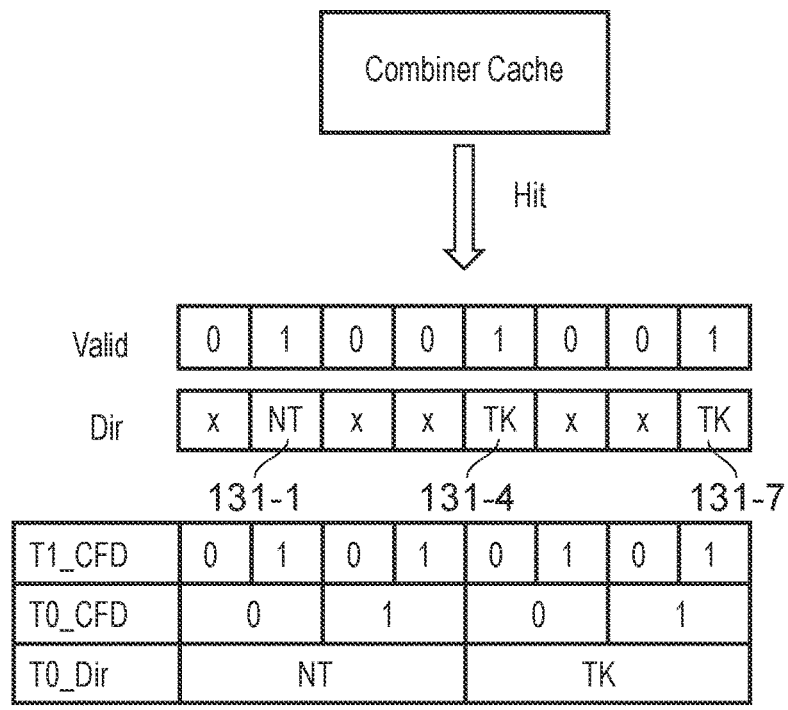
FIGS. 15 and 16 illustrate a second example of determining whether a second predictor lookup suppression condition is satisfied.
Figure 16:
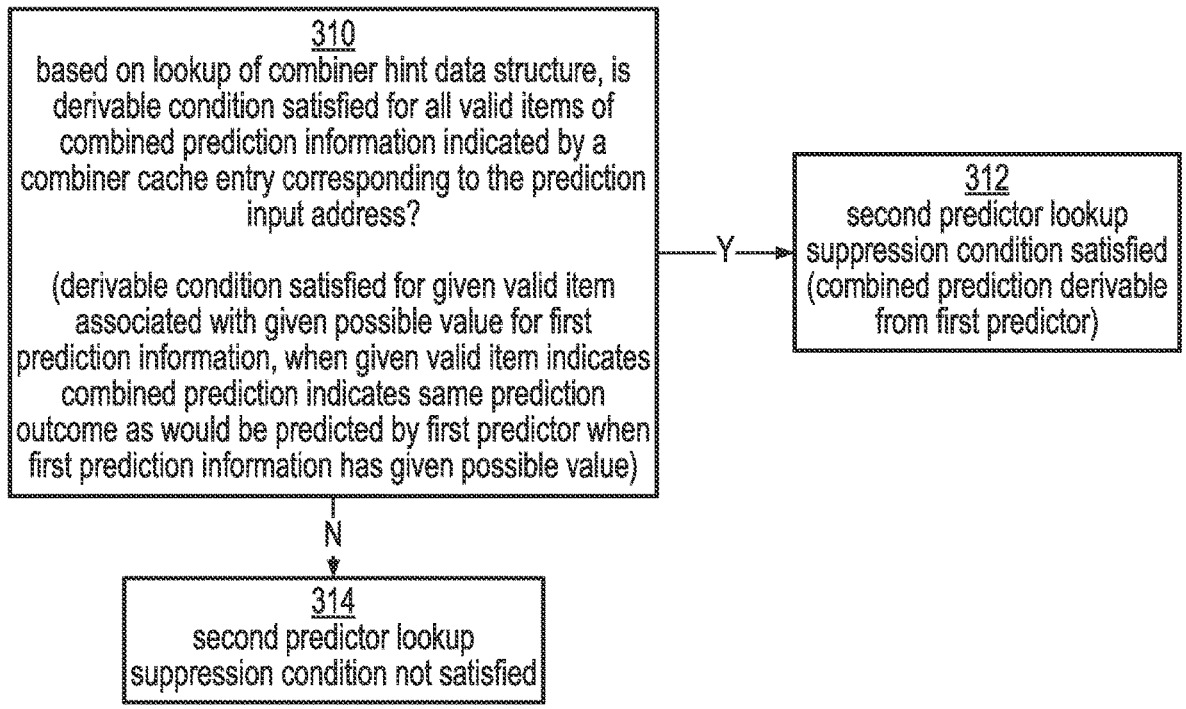

FIGS. 15 and 16 illustrate a second example of determining whether the second predictor lookup suppression condition is satisfied at step 252 of FIG. 12 (which could be applied as well as, or instead of the first example of FIGS. 13 and 14). As shown in FIG. 15, if all of the valid items 131 of combined prediction information in the combined prediction vector 130 indicate the same prediction outcome as the corresponding outcome required to be indicated by T0_Dir in the case where that item would be selected at step 206 of FIG. 10, then as all valid predictions agree with the output of the first predictor (TAGE0) 46. Therefore, there would be no possibility of this combiner cache entry 128 causing an override of the outcome T0_Dir predicted by the first predictor 46, and so power can be saved by suppressing the lookup of the second predictor 48 and using the first predictor's prediction directly. For example, in FIG. 15, the valid items are 131-1 indicating a NT prediction and 131-4, 131-7 both indicating a TK prediction, all of which match the corresponding values of T0_Dir which in the indexing scheme shown in FIG. 15 would need to be present to allow those valid items 131-1, 131-4, 131-7 to be selected for making a prediction.

Hence, as shown in FIG. 16, at step 310, based on the lookup of the combiner hint data structure 120, 380 for the prediction input address, the prediction control circuitry determines whether a derivable condition is satisfied for all valid items of combined prediction information indicated by the combiner cache entry corresponding to the prediction input address. A given item 131 of combined prediction information is associated with a given possible value for the first prediction information (e.g. in the indexing scheme of FIG. 8 the given possible value is T0_Dir=NT for items 131-0 to 131-3 and the given possible value is T0_Dir=TK for items 131-4 to 131-7). The given valid item 131 of combined prediction information is considered to satisfy the derivable condition, when the given valid item indicates a combined prediction which indicates the same prediction outcome as the prediction outcome that would be predicted by the first predictor 46 when the first prediction information has the given possible value.

Hence, if all valid items of combined prediction information in the corresponding combiner cache entry are determined, from the lookup of the combiner hint data structure 120, 380, to satisfy the derivable condition, then at step 312 the second predictor lookup suppression condition is determined to be satisfied, as the combined prediction can simply be obtained from the output first predictor 46 and so lookup of the second predictor 48 can be suppressed to save power. If the derivable condition is not satisfied by all valid items of combined prediction information, then at step 314, the second predictor lookup suppression condition is determined not to be satisfied.

Figure 17:
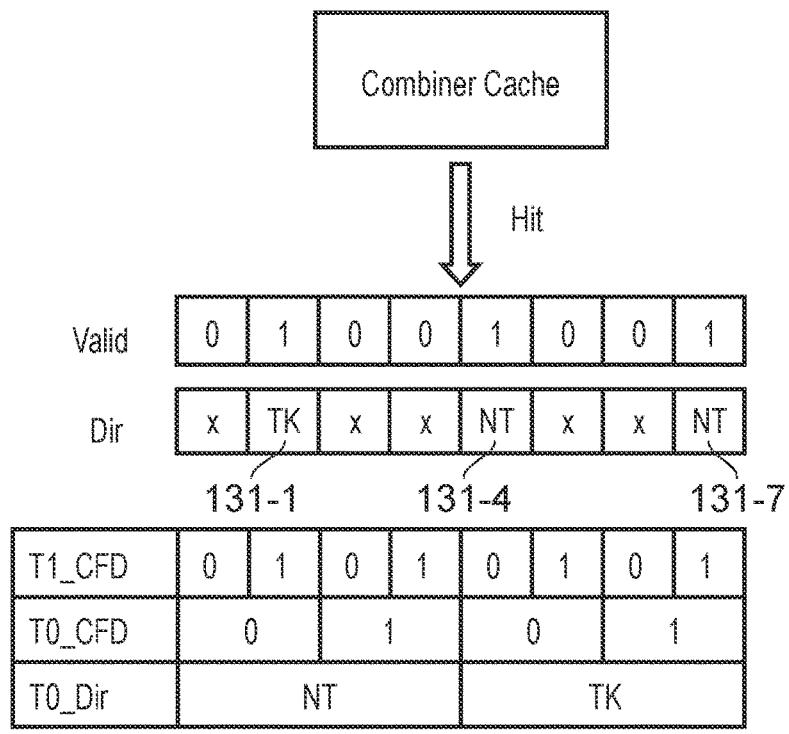
FIGS. 17 and 18 illustrate a third example of determining whether a second predictor lookup suppression condition is satisfied.
Figure 18:
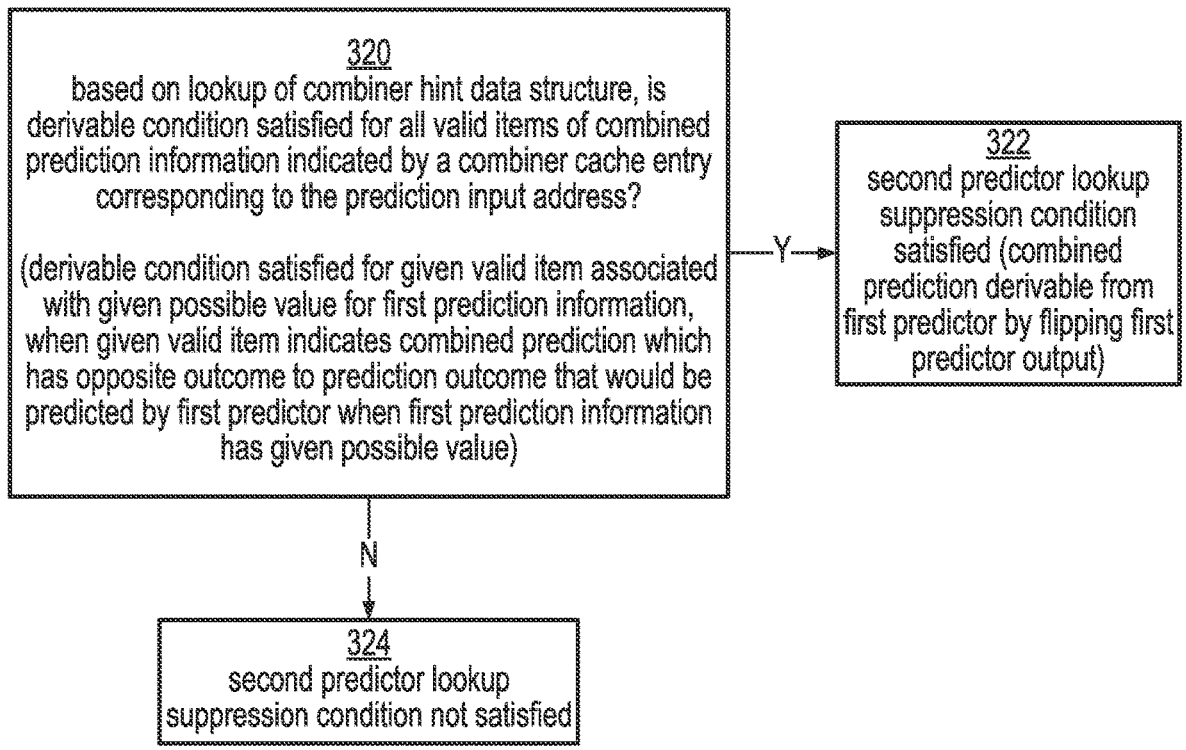

FIGS. 17 and 18 show a third example which could be applied for determining whether the second predictor lookup suppression condition is satisfied (the third example could be applied in addition to, or instead of, one or both of the first and second examples described above). This approach could be used in an example where the type of prediction being made is a two valued prediction where there are only two possible values for the prediction (e.g. taken and not-taken in the case of branch direction prediction), and where the allocation filtering step shown at step 158 is not used, so that valid items of combined prediction information are allocated to the combiner cache even if they would have agreed with the corresponding prediction by the first predictor 46. In this case, if there is a hit in the combiner cache 120 for a given prediction input address, but all valid prediction items 131 disagree with the corresponding prediction that would be made by the first predictor (TAGE0) in order for the corresponding item 131 to be selected for making a prediction, then an override of the TAGE0 prediction is certain and so again there is no need to look up TAGE1 48 as regardless of which valid item 131 is used, this would cause the prediction made by TAGE0 46 to flip state. For example, in FIG. 17 the combined prediction indicates TK for item 131-1 and NT for items 131-4, 131-7, each of which indicates the opposite prediction from the value of T0_Dir that would cause those items to be selected. All other items in the example of FIG. 17 are invalid. Hence, regardless of the value of T1_CFD, a hit in this entry would cause override of the TAGE0 prediction, and so the combined prediction could be formed, without looking up TAGE1, simply by flipping the state of the prediction made by TAGE0 46.

Hence, at step 320 of FIG. 18, based on the lookup of the combiner hint data structure 120, 380 for the prediction input address, the prediction control circuitry determines whether a derivable condition is satisfied for all valid items of combined prediction information indicated by the combiner cache entry corresponding to the prediction input address. In this example the derivable condition is satisfied by a given valid item 131 of combined prediction information when the given valid item indicates a combined prediction which has the opposite outcome to the outcome that would be predicted when the first prediction information (T0_Dir) has the given possible value. If all valid items satisfy the derivable condition, then at step 322 the second predictor lookup suppression condition is considered satisfied, and in this instance the combined prediction would be derivable from the first predictor 46 by flipping the predicted outcome indicated by the first predictor 46 (e.g. indicating taken if the first predictor 46 predicts not-taken and indicating not-taken if the first predictor 46 predicts taken). If not all valid items satisfy the derivable condition, then at step 324 the second predictor lookup suppression condition is determined not to be satisfied.

FIGS. 16 and 18 show two alternative options for determining that the derivable condition is satisfied, differing in whether the given valid item 131 is considered derivable from the prediction of the first predictor 46 when the given valid item gives the same prediction outcome as the first predictor 46 or when the given valid item gives the opposite prediction outcome to the first predictor. Hence, collectively these variants of the derivable condition evaluate whether the combined prediction indicated by each valid item 131 of combined prediction information would be derivable from the prediction of the first predictor 46 in the case where the prediction of the first predictor 46 matches the value of first prediction information (e.g. T0_Dir) corresponding to that item of combined prediction information.

Some implementations may implement only one of these alternative options for evaluating the derivable condition. Other implementations may implement both options in combination, providing logic for evaluating both variants of the derivable condition, and considering the second predictor lookup suppression condition satisfied if either (i) all valid items of combined prediction information 131 in the corresponding combiner cache entry 128 satisfy the derivable condition as shown in step 310 of FIG. 16, or (ii) all valid items of combined prediction information 131 in the corresponding combiner cache entry 128 satisfy the derivable condition as shown in step 320 of FIG. 16 (the second predictor lookup suppression condition would in this case not be considered satisfied if one or more of the valid items of combined prediction information 131 satisfy the variant of the derivable condition from step 310 of FIG. 16 and one or more other valid items of combined prediction information 131 in the corresponding combiner cache entry 128 satisfy the other variant of the derivable condition from step 320 of FIG. 18).

Figure 19:
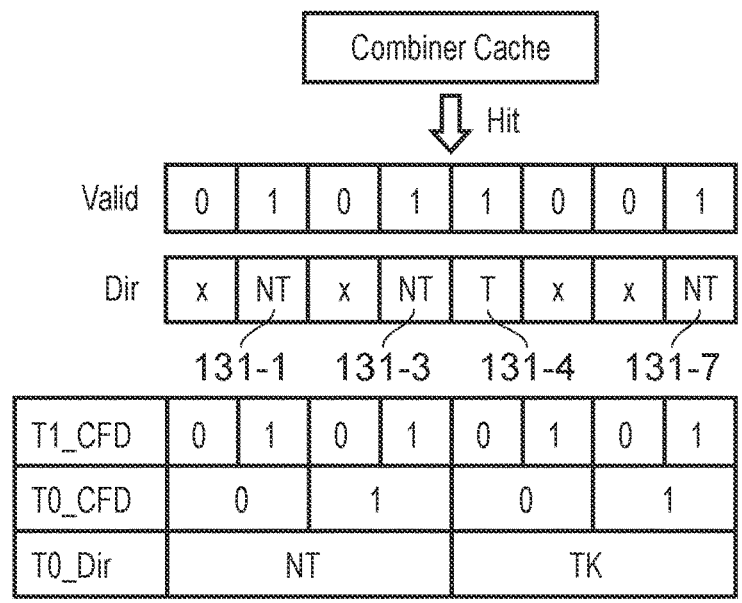
FIGS. 19 and 20 illustrate a fourth example of determining whether a second predictor lookup suppression condition is satisfied.
Figure 20:
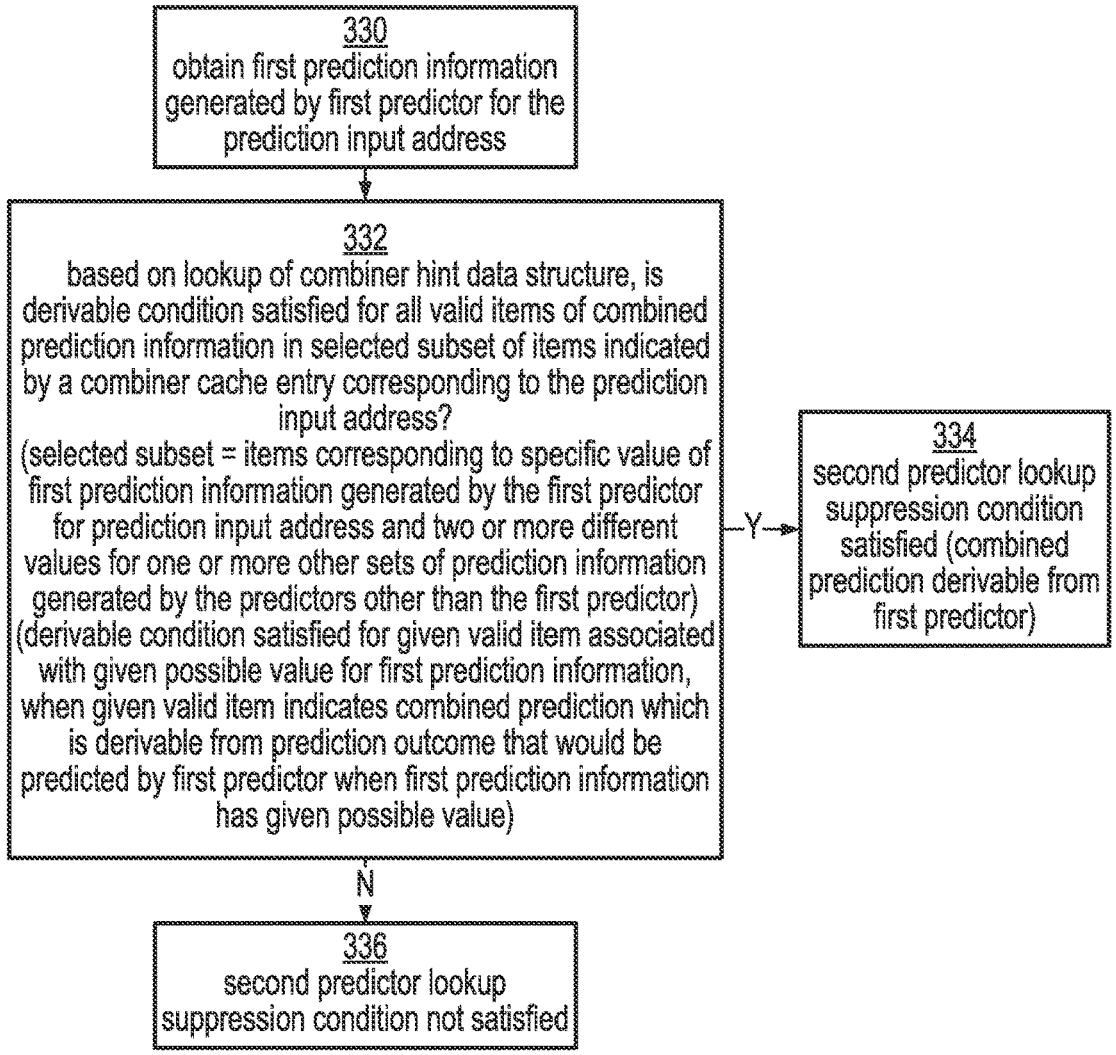

FIGS. 19 and 20 illustrate a fourth example of determining whether the second predictor lookup suppression condition is satisfied. As shown in FIG. 11, in some instances the first predictor 46 may be looked up at an earlier timing than the second predictor 48, and so some information derived from the lookup of the first predictor 46 may be available early enough to allow the first prediction information to be used to decide whether to look up the second predictor 48. If information from the first predictor 46 is available, then a pre-selection can be made regarding which subset of items 131 of combined prediction information are relevant for the specific value of the first prediction information returned by first predictor 46, and this can allow the second predictor lookup suppression condition to be evaluated based on a smaller subset of items 131 of combined prediction information. This way, even if one of the other items 131 not in that subset has a value such that, if the whole combined prediction vector 130 had been considered, there would have been at least one of those other items not satisfying the condition required to allow the second predictor's lookup to be suppressed, if the information available from the first predictor 46 at an early timing is found to indicate that those other items 131 are not relevant to the current prediction made by the first predictor 46, then the second lookup suppression condition can be based only on the items of prediction state which are capable of being selected given the specific values of the first prediction information available at an early stage from the first predictor 46.

For example, in FIG. 19, if the approach shown in FIGS. 15 and 16 had been applied given the state of the combiner cache entry 128 shown in FIG. 19, then the second predictor lookup suppression condition would have been considered not satisfied, because item 131-7 gives a different prediction outcome NT to the outcome TK indicated for T0_Dir in the case when 131-7 would be selected. However, if T0_Dir is available earlier than the timing at which it is decided whether the second predictor lookup is required, and T0_Dir for a particular prediction input address indicates NT, then it can be known that items 131-4, 131-7 which would require T1_CFD=TK in order to be selected are not relevant, so it does not matter that one of these items 131-7 diverges from the T0_Dir prediction. Instead, the decision on whether to suppress the lookup of the second predictor 48 can be based on those items corresponding to an associated T0_Dir value of NT (i.e. items 131-0 to 131-3). In the scenario shown in FIG. 19, all the valid items 131-1, 131-3 in this subset of items corresponding to T0_Dir=NT also indicate a NT prediction, and so would not cause the first predictor's prediction to be overridden. Therefore, in this scenario it would be safe to suppress the second predictor's lookup in cases where the early T0_Dir information indicates NT, but not when the early T0_Dir information indicates TK.

Hence, at step 330 of FIG. 20, the first predictor 46 obtains first prediction information based on a lookup of the prediction input address in the first predictor's prediction structures (e.g. branch prediction tables 56 of the first predictor 46). At step 332, based on the lookup of the combiner hint data structure 120, 380 for the prediction input address, the prediction control circuitry determines whether a derivable condition is satisfied for all valid items of combined prediction information within a selected subset of combined prediction items 131 indicated by the combiner cache entry corresponding to the prediction input address. This selected subset of items 131 comprises the items which correspond to the specific value of the first prediction information generated by the first predictor 46 for the prediction input address at step 330 and two or more different values for one or more other sets of prediction information generated by predictors 48, 49 other than the first predictor 46.

For example, with the indexing scheme shown in FIGS. 8 and 19, if the first prediction information available at a relatively early timing compared to the second predictor lookup is T0_Dir, then the selected subset is items 131-0, 131-1, 131-2, 131-3 if T0_Dir is NT and is items 131-4, 131-5, 131-6, 131-7 if T0_Dir is TK. If the first prediction information available early enough is T0_CFD, then the selected subset is items 131-0, 131-1, 131-4, 131-5 if T0_CFD=0 and 131-0, 131-1, 131-4, 131-5 if T0_CFD=1. If both T0_CFD and T0_Dir are available early, the selected subset would be 131-0, 131-1 for {T0_CFD, T0_Dir}={0, NT}; 131-2, 131-3 for {T0_CFD, T0_Dir}={1, NT}; 131-4, 131-5 for {T0_CFD, T0_Dir}={0, TK}; and 131-6, 131-7 for {T0_CFD, T0_Dir}={1, TK}. A given valid item in the selected subset is considered to satisfy the derivable condition if all valid items in the subset indicate a combined prediction which is derivable (e.g. the same, or the opposite, depending on which variant of the derivable condition is implemented) as the prediction outcome that would be predicted by the first predictor when the first prediction information has the given possible value that would be required to cause the given valid item to be selected for forming a prediction.

If at step 332 the prediction control circuitry determines that the derivable condition is satisfied for all valid items in the selected subset of combined prediction information items 131, then even if one item 131 not in that subset does not satisfy the derivable condition, the second predictor lookup suppression condition can still be considered satisfied at step 334. This provides an additional opportunity to suppress the lookup of the second predictor 48 which would not be possible if the pre-selection of the subset of items based on the known value of early information from the first predictor's prediction information was not implemented. Hence, this can achieve greater power savings than an implementation which does not pre-select the selected subset. In this case, the combined prediction is formed based on the information derivable from the first predictor 46, as it has been determined that all options selectable based on the second predictor's output can still be derivable from the first predictor's output without actually looking up the second predictor 48.

On the other hand, if the prediction control circuitry determines, based on the lookup of the combiner hint data structure 120, 380 for the prediction input address, that at least one valid item of the selected subset of items 131 would not satisfy the derivable condition, then at step 336 the prediction control circuitry determines that the second predictor lookup suppression condition is not satisfied.

Figure 21:
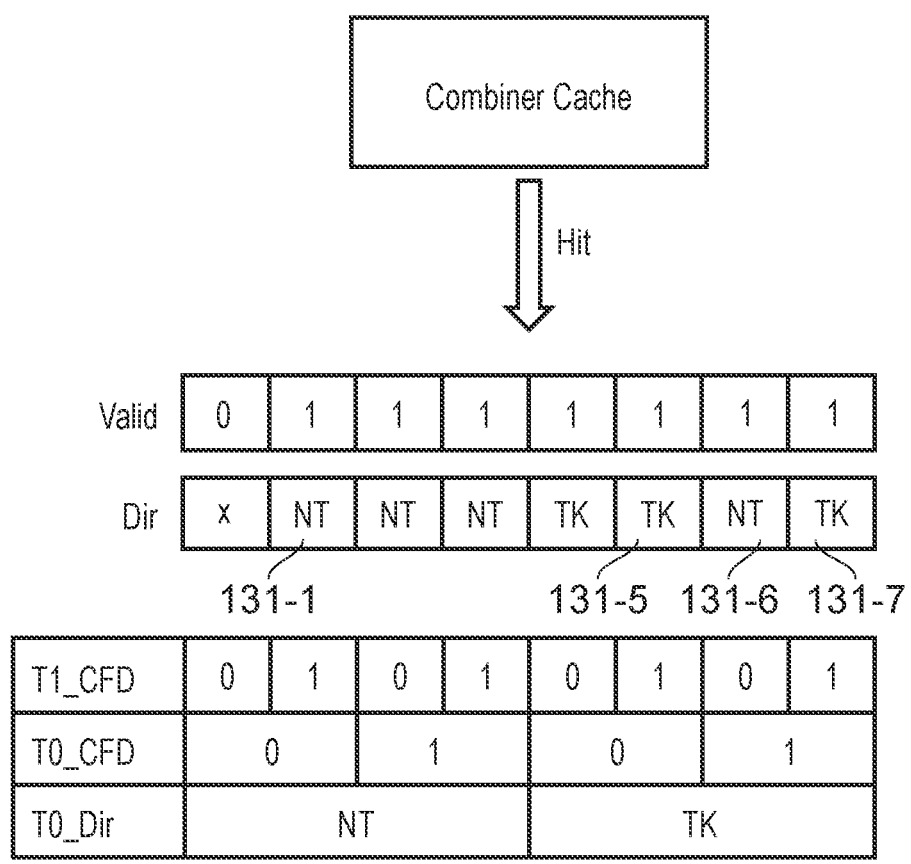
FIGS. 21 and 22 illustrate a fifth example of determining whether a second predictor lookup suppression condition is satisfied.
Figure 22:
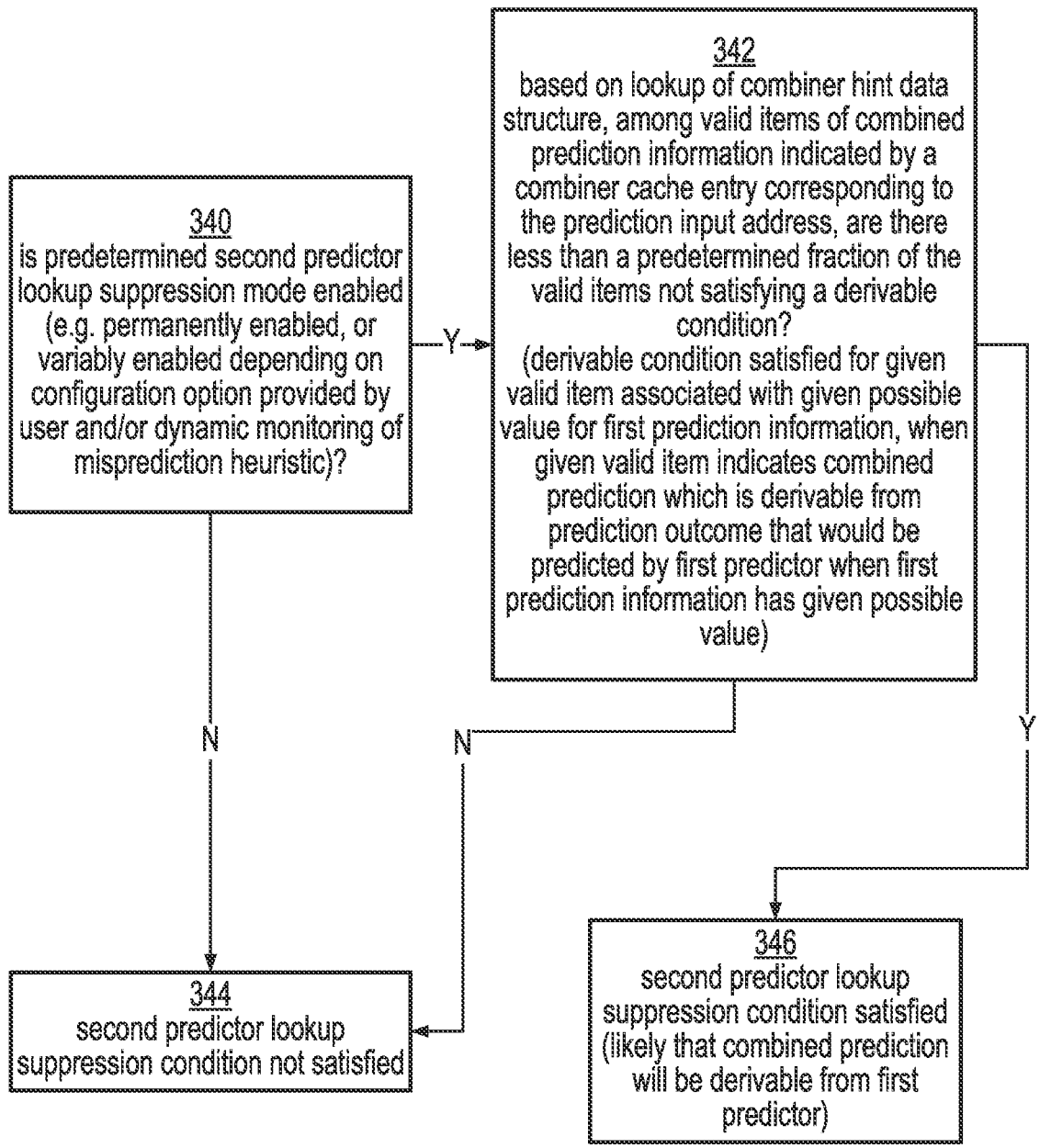

FIGS. 21 and 22 show a fifth example of determining whether the second predictor lookup suppression condition is satisfied. In this example, the second predictor lookup suppression condition can be considered satisfied even if there is at least one item 131 of combined prediction information in the corresponding combiner cache entry 128 which indicates a prediction which would not be derivable from the prediction of the first predictor 46 in a case when the first predictor 46 generates first prediction information with a value that would cause that item to be selected.

For example, in the example of FIG. 21, items 131-1 to 131-5 and 131-7 are all valid and each indicate a prediction consistent with the prediction made by the first predictor 46 when T0_Dir has the associated value (NT for items 131-1 to 131-3 and TK for 131-4, 131-5, 131-7) that would cause those items to be selected. However, valid item 131-6 indicates NT, which is inconsistent with the value TK of T0_Dir that would be required for item 131-6 to be selected. Therefore, applying the technique of FIG. 16, say, would cause this combiner cache entry 128 to be considered not to satisfy the second predictor lookup suppression condition.

However, in practice, that one mismatching item 131-6 might never get used for any real lookup of the combiner cache. For example, item 131-6 might record information about a transient phase of prediction which no longer occurs. In this particular example, item 131-6 corresponds to T1_CFD=0, e.g. indicating relatively low confidence in the prediction by second predictor 48. As indicated by the TK prediction of item 131-7, subsequently once T1_CFD reached high confidence (T1_CFD=1), the NT prediction of item 131-6 has been superseded by a TK prediction. As second predictor 48 has now reached higher confidence for the address mapping to this combiner cache entry 128, it is likely that there will be no subsequent instances of lookups where the combiner cache entry 128 is looked up for that address based on the combination {T0_Dir=TK, T0_CFD=1, T1_CFD=0} corresponding to item 131-6. Hence, continuing to perform the lookups to the second predictor 48 solely because item 131-6 remains valid and differs from the corresponding T0_Dir prediction may waste power.

To allow the second predictor's lookup to be suppressed even in this scenario, an option is to allow the second predictor lookup suppression condition to be satisfied if less than a predetermined fraction (or a predetermined number) of valid items of combined prediction information in the corresponding combiner cache entry 128 do not indicate a same outcome as the corresponding first predictor output in a case where those items would be selected. For example, the predetermined fraction could be set at a threshold level such that a certain maximum number of items (e.g. 1 or 2) are allowed not to satisfy the derivable condition while still permitting the lookup suppression condition to be satisfied, but if more than that maximum number of items are not derivable from the first predictor's output, then the lookup suppression condition is not satisfied.

However, while this strategy could sometimes help to save power, on other occasions it might impact performance because it may cause too many mispredictions if the second predictor's lookup is suppressed on an occasion where if it had been looked up, the corresponding item 131 selected from the combiner cache would have overridden the first predictor's prediction. Therefore, some implementations may selectively apply this fifth example, depending on whether a predetermined second predictor lookup suppression mode is enabled or disabled. The enabling/disabling of the second predictor lookup suppression mode could be based on a static configuration option provided by a user, or based on dynamic monitoring of a misprediction heuristic (e.g. a metric indicating misprediction rate). This misprediction heuristic could be tracked globally for all predictions or could tracked specific to certain subsets of addresses (e.g. combiner cache entries 128 could include an indication of whether previously applying the predetermined second predictor lookup suppression mode caused too many mispredictions based on that entry).

Hence, as shown in FIG. 22, at step 340 the prediction control circuitry determines whether the predetermined second predictor lookup suppression mode is enabled. In some examples, this mode could be permanently enabled (with no option to disable it). In other examples, this mode could be variably enabled/disabled based on one or both of configuration control information provided by a user and/or dynamic monitoring of a misprediction heuristic.

If the predetermined second predictor lookup suppression mode is enabled, then at step 342, based on lookup of the combiner hint data structure 120, 380, the prediction control circuitry determines whether, among valid items of combined prediction information indicated by a combiner cache entry 128 corresponding to the prediction input address, less than a predetermined fraction of those valid items do not satisfy a derivable condition. The derivable condition is considered satisfied for a given valid item associated with a given possible value for the first prediction information, when the given valid item indicates combined prediction which is derivable from (e.g. the same as) the prediction outcome that would be predicted by first predictor when first prediction information has the given possible value. If less than the predetermined fraction of valid items do not satisfy the derivable condition, then at step 346 the second predictor lookup suppression is considered satisfied, as it is considered likely (but not certain) that the combined prediction will be derivable from the output of the first predictor 46.

If either the predetermined second predictor lookup suppression mode is disabled or based on the lookup of the combiner hint data structure 120, 380 it is determined that there are more than the predetermined fraction of valid items not satisfying the derivable condition, then the second predictor lookup suppression condition is determined not to be satisfied at step 344.

The prediction control circuitry can implement one or more of the examples shown in FIGS. 13 to 22 for evaluating whether the second predictor lookup suppression condition is satisfied, individually or in combination. If circuit logic is implemented for evaluating more than one of these alternatives, then the second predictor lookup is controlled based on the Boolean OR of indications indicating whether each variant of the second predictor lookup suppression condition is satisfied, so that if the second predictor lookup suppression condition is considered satisfied according to any one of these alternatives, that is enough to suppress the lookup of the second predictor 48, even if other alternative methods would not have detected the second predictor lookup suppression condition as being satisfied.

Figure 23:
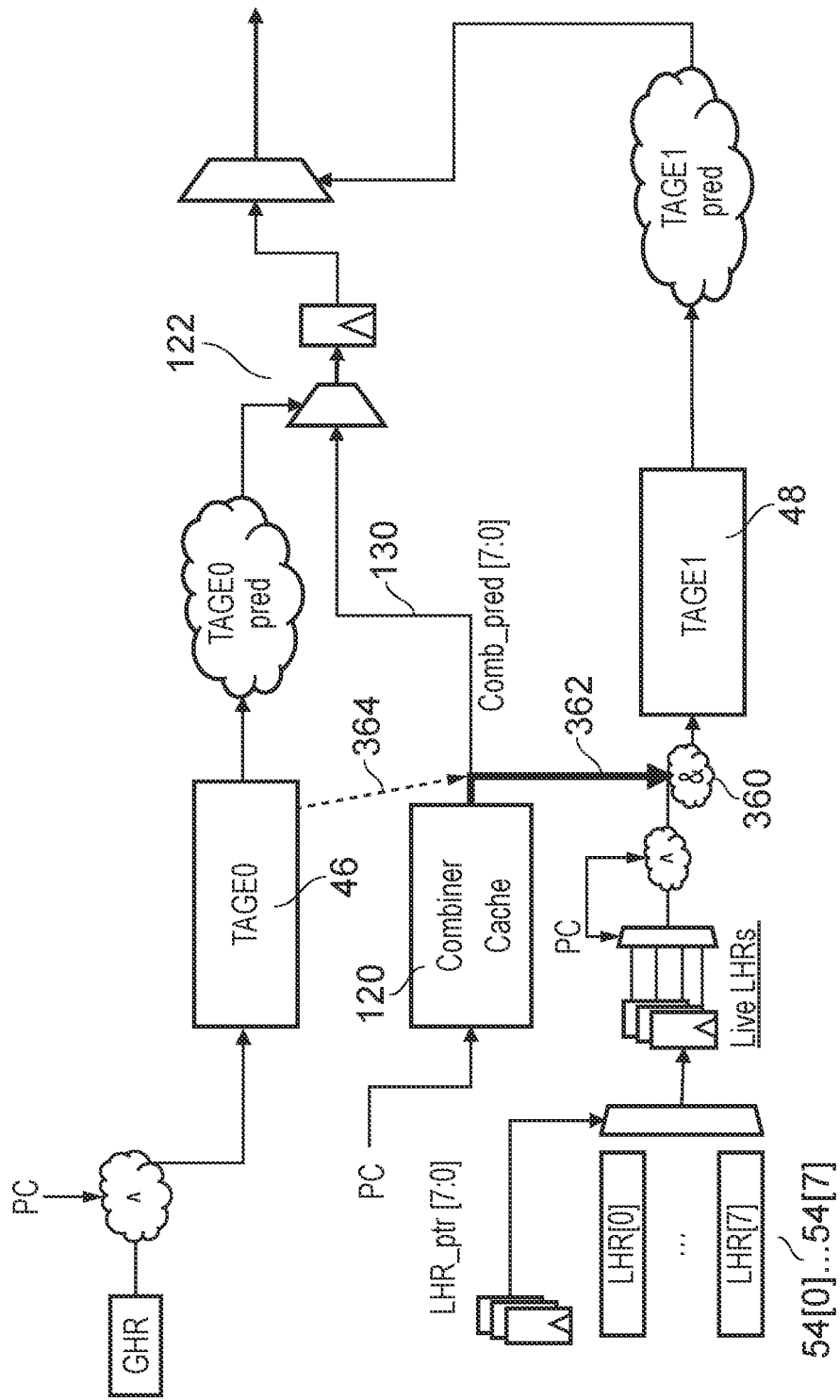
FIG. 23 illustrates an example where the combiner hint data structure comprises the combiner cache structure itself.

FIG. 23 shows a first example of using hint information derived from analysis of information in the combiner cache 120 to control lookup of the second predictor 48. Here, the prediction control circuitry 360 is shown as logic which gates the lookup to the second predictor 48 based on hint information 362 from the combiner cache 120. In this example, the combiner cache 120 itself acts as the combiner hint data structure mentioned above. When the combiner cache 120 is looked up based on the prediction input address and a hit is detected, then as well as outputting the combined prediction vector 130 to the selection logic of combiner cache lookup circuitry 122, the hint information 362 corresponding to the hit combiner cache entry 128 is obtained and supplied to prediction control circuitry 360. This hint information 362 could be derived on the fly by circuit logic which processes the valid vector 132 and combined prediction vector 130 at prediction time to identify whether any one or more of the variants of second predictor lookup suppression condition shown in FIGS. 14, 16, 18, 20 and 22 is satisfied. Alternatively, this hint information 362 could have been pre-computed from the valid vector 132 and combined prediction vector 130 in advance (e.g. at the time of updating the corresponding entry of the combiner cache 120 at step 164 of FIG. 9), and stored in the combiner cache entry 128 for read out at prediction time.

Figure 24:
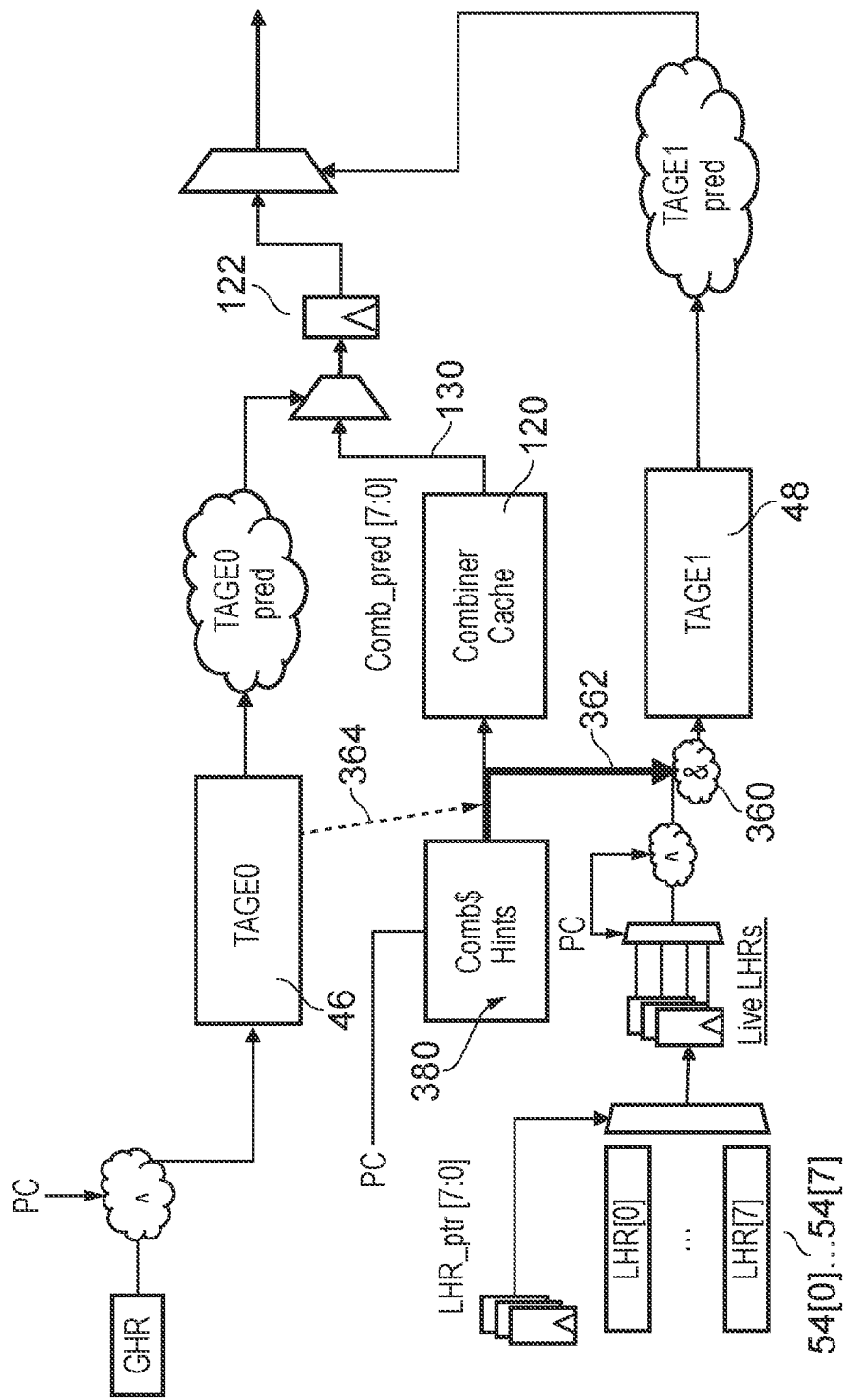
FIG. 24 illustrates an example where the combiner hint data structure is separate from the combiner cache structure.

Alternatively, as shown in FIG. 24, a separate combiner hint data structure 380 could be provided, separate from the combiner cache 120 itself, which can be more power efficient, as the hint structure 380 can be smaller than the combiner cache 120 itself. The hint structure 380 can cache hint information, to allow the lookup to the combiner cache 120 itself to also be suppressed (in addition to the lookup to the second predictor 48), in the case when the second predictor lookup suppression condition is satisfied. The information in the combiner hint structure 380 can be pre-computed in advance (e.g. at time of updating the combiner cache 120, or through a periodic scrub of the combiner cache 120), so that at prediction time the hint information can be looked up in the combiner hint structure 380 and does not need re-computing from a hit combiner cache entry 128. In some implementations, providing the additional hint structure 380 can make it simpler to meet circuit timing requirements, as the hint structure 380 can be smaller and physically closer to the second predictor 48 than the larger combiner cache 120.

Regardless of whether any pre-computed hint information is recorded in the combiner cache 120 itself or in a separate hint structure 380, that hint information can take a variety of forms, but in general it provides a summary of information in the combiner cache 120. The hint structure may have a direct-mapped, set-associative or fully-associative structure, and may use an indexing/tagging scheme of corresponding address granularity to the granularity used for indexing/tagging of the combiner cache. However, rather than storing a multi-bit valid vector and multi-bit prediction vector for each entry as in the combiner cache 120, the hint structure can comprise a valid bit indicating whether the hint is valid, and as little as a single "hint" bit indicating whether the second predictor lookup suppression condition is considered satisfied for that address.

If the example of FIGS. 19 and 20 is used, then two or more bits of hint information may be provided, each derived from a corresponding subset of items 131 of combined prediction state from the corresponding combiner cache entry 128 which correspond to a particular value of first prediction information provided by first predictor 46. Hence, at the time of looking up the hint information, early prediction information 364 (indicated by the dashed line in FIGS. 23 and 24) can be used to select between the respective bits of hint information to determine which bit is relevant to the specific value of first prediction information provided at an early timing by the first predictor 46. The relevant hint bit selected based on the early prediction information 364 from the first predictor 46 indicates whether the corresponding subset of items 131 in the combiner cache would satisfy the derivable condition.

In the examples above, the use of the combiner cache and suppression of lookup of a second predictor 48 is discussed in the context of a branch predictor 40, where the combined predictions are used to determine predicted branch direction (taken/not-taken), and used to control speculative fetching of instructions by fetch stage 6. However, it will be appreciated that similar techniques for combining prediction outputs may be used for other types of predictor within a data processing system, such as a data value predictor for predicting a value of data to be loaded from memory by a load instruction (or a value of a result of an arithmetic/logical instruction), to allow subsequent instructions to execute speculatively based on the predicted data value before the actual value of that data value is determined. Therefore, these techniques are not limited to branch predictions.

Concepts described herein may be embodied in a system comprising at least one packaged chip. The prediction circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 25:
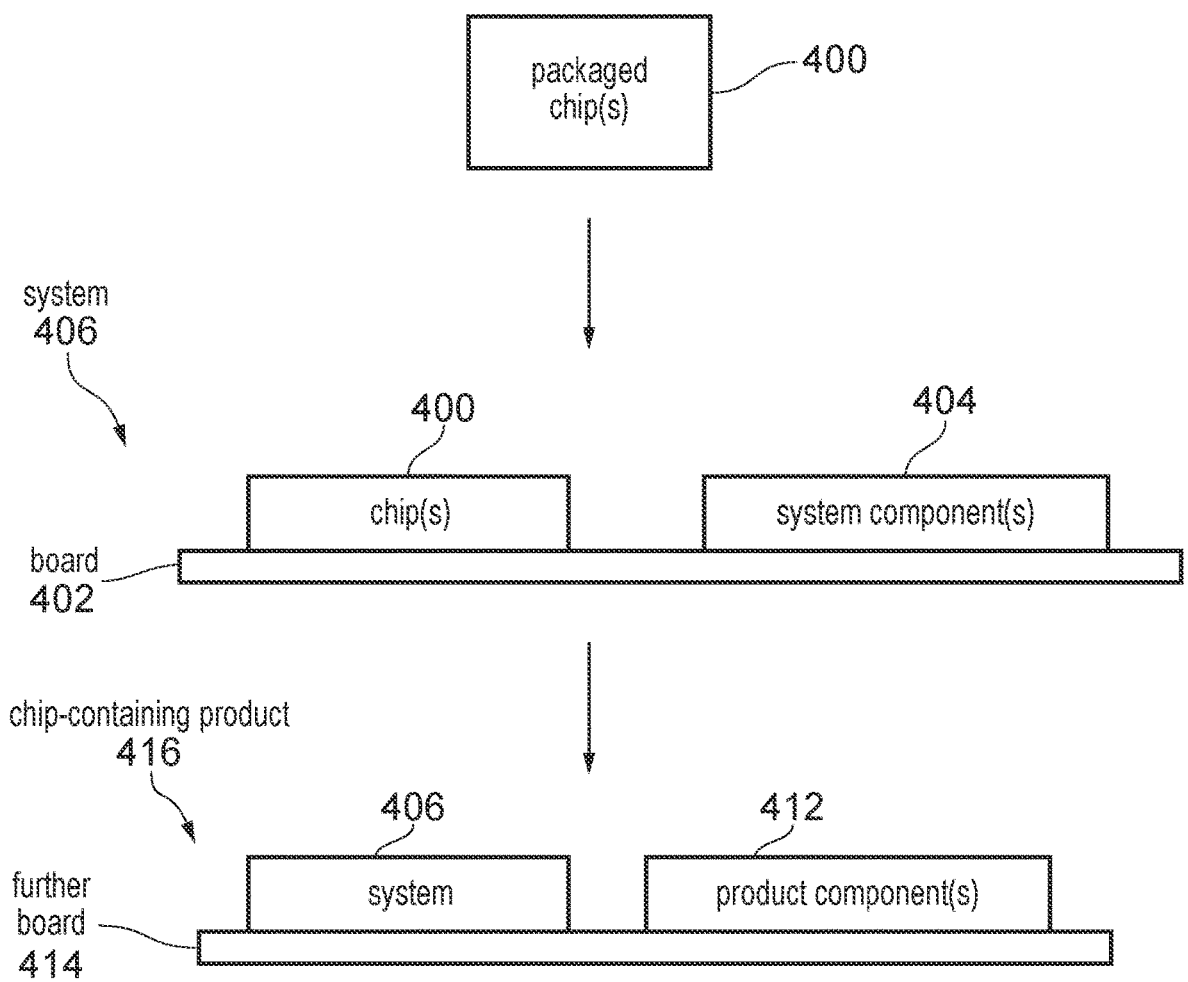
FIG. 25 illustrates a system and a chip-containing product.

As shown in FIG. 25, one or more packaged chips 400, with the prediction circuitry described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the prediction circuitry described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Examples are set out in the following clauses:

1. Prediction circuitry to generate a prediction associated with a prediction input address for controlling a speculative action by a processor, the prediction circuitry comprising:
   combiner circuitry to determine a combined prediction by applying a prediction combination function to a given address and respective sets of prediction information generated by a plurality of predictors corresponding to the given address;
   a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
   combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

2. The prediction circuitry according to clause 1, in which the prediction combination function comprises a perceptron function to generate the combined prediction based on a sum of a plurality of weights selected based on the given address and the respective sets of prediction information.

3. The prediction circuitry according to any of clauses 1 and 2, in which the combiner circuitry is configured to determine the combined prediction based on entries of a plurality of untagged combiner tables indexed based on the given address and the respective sets of prediction information.

4. The prediction circuitry according to any of clauses 1 to 3, in which the combiner cache structure comprises a tagged cache structure, each combiner cache entry having an associated tag value indicative of at least a portion of the address indication.

5. The prediction circuitry according to any of clauses 1 to 4, in which the combiner cache structure comprises a set-associative cache structure capable of reading, in a single lookup cycle using a single read port, a set of two or more combiner cache entries associated with different address indications.

6. The prediction circuitry according to any of clauses 1 to 5, in which, in response to resolution of an actual outcome associated with a prediction for a previous prediction input address, the combiner circuitry is configured to:
   update combiner prediction state information associated with the previous prediction input address; and
   update a corresponding combiner cache entry of the combiner cache structure corresponding to the previous prediction input address, based on an updated combined prediction determined by applying the prediction combination function to the updated combiner prediction state information associated with the previous prediction input address.

7. The prediction circuitry according to clause 6, in which the update to the corresponding combiner cache entry comprises updating at least a target item of combined prediction information selected based on a specific combination of values of the respective sets of prediction information generated by the plurality of predictors corresponding to the previous prediction input address.

8. The prediction circuitry according to any of clauses 6 and 7, in which the update to the corresponding combiner cache entry comprises updating at least two items of combined prediction information of the corresponding combiner cache entry, based on applying the prediction combination function to the previous prediction input address and at least two different combinations of values for the respective sets of prediction information.

9. The prediction circuitry according to any of clauses 6 to 8, in which in response to determining, when the update of the corresponding cache entry of the combiner cache structure based on the updated combiner prediction state information would require allocation of a new combiner cache entry to the combiner cache structure, that each valid item of combined prediction information to be specified in the new combiner cache entry based on the updated combined prediction satisfies a redundant allocation condition, the combiner circuitry is configured to suppress allocation of the new combiner cache entry to the combiner cache structure;

wherein a given item of combined prediction information, for which selection of the given item of combined prediction information as the selected item of combined prediction information would depend on first prediction information generated by a first predictor of the plurality of predictors corresponding to a given prediction outcome, satisfies the redundant allocation condition when the updated combined prediction to be specified in the given item of combined prediction information specifies the same prediction outcome as the given prediction outcome.

10. The prediction circuitry according to any of clauses 1 to 9, in which, in response to the combiner cache lookup circuitry detecting a miss in the combiner cache structure for the prediction input address, the combiner cache lookup circuitry is configured to generate the prediction for controlling the speculative action based on a prediction made by a first predictor of the plurality of predictors, independent of a prediction made by one or more other predictors of the plurality of predictors.

11. The prediction circuitry according to any of clauses 1 to 10, in which the given combiner cache entry comprises a plurality of valid indications indicative of validity of the plurality of items of combined prediction information respectively, and the combiner cache lookup circuitry is configured to treat the prediction input address as missing in the combiner cache structure in response to determining that the combiner cache structure includes the selected combiner cache entry for which the address indication corresponds to the prediction input address but the selected item of combined prediction information is indicated as invalid by a corresponding one of the valid indications.

12. The prediction circuitry according to any of clauses 1 to 11, in which the combiner cache lookup circuitry is configured to initiate a lookup of the combiner cache structure based on the prediction input address before a set of prediction information corresponding to the prediction input address becomes available from at least one of the plurality of predictors.

13. The prediction circuitry according to any of clauses 1 to 12, in which the combined prediction selection circuitry is configured to select a subset of the items of combined prediction information of the selected combiner cache entry based on first prediction information generated corresponding to the prediction input address by a first predictor of the plurality of predictors, before second prediction information corresponding to the prediction input address becomes available from a second predictor of the plurality of predictors.

14. The prediction circuitry according to any of clauses 1 to 13, in which a second predictor of the plurality of predictors is configured to generate second prediction information based on a lookup of a second predictor structure based on local history information tracking history for a specific subset of addresses including the prediction target address; and a first predictor of the plurality of predictors is configured to generate first prediction information based on a lookup of a first predictor structure independent of the local history information.

15. The prediction circuitry according to any of clauses 1 to 14, in which a first predictor of the plurality of predictors comprises a first TAGE (tagged-geometric) predictor comprising a first set of tagged-geometric tables looked up based on different lengths of first history information; and a second predictor of the plurality of predictors comprises a second TAGE predictor comprising a second set of tagged-geometric tables looked up based on different lengths of second history information.

16. The prediction circuitry according to any of clauses 1 to 15, in which the prediction comprises a branch prediction.

17. A system comprising:
the prediction circuitry of any of clauses 1 to 16, implemented in at least one packaged chip;
at least one system component; and
a board,
wherein the at least one packaged chip and the at least one system component are assembled on the board.

18. A chip-containing product comprising the system of clause 17 assembled on a further board with at least one other product component.

19. A non-transitory computer-readable medium to store computer-readable code for fabrication of prediction circuitry to generate a prediction associated with a prediction input address for controlling a speculative action by a processor, the prediction circuitry comprising:
combiner circuitry to determine a combined prediction by applying a prediction combination function to a given address and respective sets of prediction information generated by a plurality of predictors corresponding to the given address;
a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

20. A method for generating a prediction associated with a prediction input address for controlling a speculative action by a processor, the method comprising:
looking up a combiner cache structure based on the prediction input address, the combiner cache structure comprising a plurality of combiner cache entries, where a given combiner cache entry is associated with an address indication and is indicative of a plurality of items of combined prediction information determined by combiner circuitry applying a prediction combination function to a given address corresponding to the address indication and a plurality of different combinations of possible values for respective sets of prediction information generated by a plurality of predictors corresponding to the given address;

based on the lookup, identifying a selected combiner cache entry for which the address indication corresponds to the prediction input address; and generating the prediction for controlling the speculative action based on a selected item of combined prediction information selected from the selected combiner cache entry based on the respective sets of prediction information generated by the plurality of predictors corresponding to the prediction input address.

21 Prediction circuitry to generate a prediction associated with a prediction input address for controlling a speculative action by a processor, the prediction circuitry comprising:

combiner circuitry to generate a combined prediction associated with a given address based on combining respective sets of prediction information generated by a plurality of predictors comprising at least a first predictor and a second predictor, wherein the combiner circuitry is configured to generate the combined prediction using combiner prediction state information obtained in a lookup of at least one combiner table structure based on the given address and the respective sets of prediction information; and predictor control circuitry to:
determine, based on a lookup of the prediction input address in a combiner hint data structure, whether a second predictor lookup suppression condition is satisfied for the prediction input address indicating that the combined prediction that would be determined by the combiner circuitry for the prediction input address is likely to be derivable from a prediction outcome predicted by the first predictor for the prediction input address without looking up the second predictor; and in response to determining that the second predictor lookup suppression condition is satisfied:
suppress a lookup of the second predictor based on the prediction input address; and
generate the prediction associated with the prediction input address based on the prediction outcome predicted by the first predictor for the prediction input address.

22 The prediction circuitry according to clause 21, comprising a combiner cache structure comprising a plurality of combiner cache entries, where a given combiner cache entry is associated with a corresponding address indication and is indicative of a plurality of items of combined prediction information determined by the combiner circuitry for an address corresponding to the address indication and a plurality of different combinations of possible values for the respective sets of prediction information.

23. The prediction circuitry according to clause 22, in which, when the second predictor lookup suppression condition is not satisfied, the predictor control circuitry is configured to select the prediction associated with the prediction input address based on a selected item of combined prediction information obtained from a selected combiner cache entry for which the address indication corresponds to the prediction input address, the selected item of combined prediction information comprising the item of combined prediction information which corresponds to values of the respective sets of prediction information determined by the plurality of predictors corresponding to the prediction input address.

24. The prediction circuitry according to any of clauses 22 or 23, in which the predictor control circuitry is configured to determine whether the second predictor lookup suppression condition is satisfied for the prediction input address depending on analysis of at least a subset of the items of combined prediction information specified by the selected combiner cache entry.

25. The prediction circuitry according to any of clauses 22 to 24, in which the combiner hint data structure comprises the combiner cache structure.

26. The prediction circuitry according to any of clauses 22 to 24, in which the combiner hint data structure is separate from the combiner cache structure and is configured to store combiner hint information providing a summary of information derivable from the combiner cache structure.

27 The prediction circuitry according to any of clauses 22 to 26, in which:

in response to resolution of an actual outcome associated with a prediction for a previous prediction input address, the combiner circuitry is configured to:
update the combiner prediction state information of the at least one combiner table structure corresponding to the previous prediction input address; and
update a corresponding combiner cache entry of the combiner cache structure corresponding to the previous prediction input address, based on an updated combined prediction generated from the updated combiner prediction state information.

28 The prediction circuitry according to clause 27, in which the combiner circuitry is configured to suppress allocation of a new combiner cache entry to the combiner cache structure in response to a determination that each valid item of combined prediction information to be specified in the new combiner cache entry based on the updated combined prediction satisfies a redundant allocation condition;

wherein a given item of combined prediction information, for which selection of the given item of combined prediction information as a selected item of combined prediction information to be used for generating the prediction would depend on first prediction information generated by the first predictor corresponding to a given prediction outcome, satisfies the redundant allocation condition when the updated combined prediction to be specified in the given item of combined prediction information specifies the same prediction outcome as the given prediction outcome.

29 The prediction circuitry according to any of clauses 22 to 28, in which the predictor control circuitry is configured to determine that the second predictor lookup suppression condition is satisfied in response to determining, based on the lookup of the prediction input address in the combiner hint data structure, that a miss would be detected in a lookup of the prediction input address in the combiner cache structure.

30. The prediction circuitry according to any of clauses 22 to 29, in which the predictor control circuitry is configured to determine that the second predictor lookup suppression condition is satisfied in response to determining, based on the lookup of the prediction input address in the combiner hint data structure, that all valid items of combined prediction information indicated by a combiner cache entry corresponding to the prediction input address satisfy a derivable condition, where a given valid item of combined prediction information, that is associated with a given possible value for first prediction information generated by the first predictor, satisfies the derivable condition when the given valid item of combined prediction information indicates a combined prediction which is derivable from the prediction outcome that would be predicted by the first predictor for the prediction input address when the first prediction information generated by the first predictor has the given possible value.

31. The prediction circuitry according to any of clauses 22 to 30, in which the predictor control circuitry is configured to determine that the second predictor lookup suppression condition is satisfied in response to determining, based on the lookup of the prediction input address in the combiner hint data structure, that all valid items of combined prediction information in a selected subset of items of combined prediction information indicated by a combiner cache entry corresponding to the prediction input address satisfy a derivable condition, where a given valid item of combined prediction information, that is associated with a given possible value for first prediction information generated by the first predictor, satisfies the derivable condition when the given valid item of combined prediction information indicates a combined prediction which is derivable from the prediction outcome that would be predicted by the first predictor for the prediction input address when the first prediction information generated by the first predictor has the given possible value, and the selected subset of items comprises the items of combined prediction information which correspond to a specific value of first prediction information generated by the first predictor for the prediction input address and a plurality of different possible values one or more other sets of prediction information generated by one or more of the plurality of predictors other than the first predictor.

32. The prediction circuitry according to any of clauses 22 to 31, in which at least when a predetermined second predictor lookup suppression mode is enabled, the predictor control circuitry is configured to determine that the second predictor lookup suppression condition is satisfied in response to determining, based on the lookup of the prediction input address in the combiner hint data structure, that less than a predetermined fraction of valid items of combined prediction information indicated by a combiner cache entry corresponding to the prediction input address do not satisfy a derivable condition, where a given valid item of combined prediction information, that is associated with a given possible value for first prediction information generated by the first predictor, satisfies the derivable condition when the given valid item of combined prediction information indicates a combined prediction which is derivable from the prediction outcome that would be predicted by the first predictor for the prediction input address when the first prediction information generated by the first predictor has the given possible value.

33. The prediction circuitry according to clause 32, in which the predictor control circuitry is configured to control whether the predetermined second predictor lookup suppression mode is enabled or disabled based on monitoring of a misprediction heuristic.

34. The prediction circuitry according to any of clauses 21 to 33, in which the second predictor is configured to generate second prediction information based on a lookup of a second predictor structure based on local history information tracking history for a specific subset of addresses including the prediction target address; and the first predictor is configured to generate first prediction information based on a lookup of a first predictor structure independent of the local history information.

35. The prediction circuitry according to any of clauses 21 to 34, in which the first predictor comprises a first TAGE (tagged-geometric) predictor comprising a first set of tagged-geometric tables looked up based on different lengths of first history information; and the second predictor comprises a second TAGE predictor comprising a second set of tagged-geometric tables looked up based on different lengths of second history information.

36. The prediction circuitry according to any of clauses 21 to 35, in which the prediction comprises a branch prediction.

37. A system comprising:
the prediction circuitry of any of clauses 21 to 36, implemented in at least one packaged chip;
at least one system component; and
a board,
wherein the at least one packaged chip and the at least one system component are assembled on the board.

38. A chip-containing product comprising the system of clause 37 assembled on a further board with at least one other product component.

39. A non-transitory computer-readable medium to store computer-readable code for fabrication of prediction circuitry to generate a prediction associated with a prediction input address for controlling a speculative action by a processor, the prediction circuitry comprising:
combiner circuitry to generate a combined prediction associated with a given address based on combining respective sets of prediction information generated by a plurality of predictors comprising at least a first predictor and a second predictor, wherein the combiner circuitry is configured to generate the combined prediction using combiner prediction state information obtained in a lookup of at least one combiner table structure based on the given address and the respective sets of prediction information; and
predictor control circuitry to:
determine, based on a lookup of the prediction input address in a combiner hint data structure, whether a second predictor lookup suppression condition is satisfied for the prediction input address indicating that the combined prediction that would be determined by the combiner circuitry for the prediction input address is likely to be derivable from a prediction outcome predicted by the first predictor for the prediction input address without looking up the second predictor; and
in response to determining that the second predictor lookup suppression condition is satisfied:
suppress a lookup of the second predictor based on the prediction input address; and
generate the prediction associated with the prediction input address based on the prediction outcome predicted by the first predictor for the prediction input address.

40. A method for generating a prediction associated with a prediction input address for controlling a speculative action by a processor, the method comprising:
generating a combined prediction associated with a given address based on combining respective sets of prediction information generated by a plurality of predictors comprising at least a first predictor and a second predictor, wherein the combined prediction is generated using combiner prediction state information obtained in a lookup of at least one combiner table structure based on the given address and the respective sets of prediction information;

determining, based on a lookup of the prediction input address in a combiner hint data structure, whether a second predictor lookup suppression condition is satisfied for the prediction input address indicating that the combined prediction that would be determined by the combiner circuitry for the prediction input address is likely to be derivable from a prediction outcome predicted by the first predictor for the prediction input address without looking up the second predictor; and in response to determining that the second predictor lookup suppression condition is satisfied:
  suppressing a lookup of the second predictor based on the prediction input address; and
  generating the prediction associated with the prediction input address based on
the prediction outcome predicted by the first predictor for the prediction input address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Prediction circuitry to generate a prediction associated with a prediction input address for controlling a speculative action by a processor, the prediction circuitry comprising:
  combiner circuitry to determine a combined prediction by applying a prediction combination function to a given address and respective sets of prediction information generated by a plurality of predictors corresponding to the given address;
  a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
  combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

2. The prediction circuitry according to claim 1, in which the prediction combination function comprises a perceptron function to generate the combined prediction based on a sum of a plurality of weights selected based on the given address and the respective sets of prediction information.

3. The prediction circuitry according to claim 1, in which the combiner circuitry is configured to determine the combined prediction based on entries of a plurality of untagged combiner tables indexed based on the given address and the respective sets of prediction information.

4. The prediction circuitry according to claim 1, in which the combiner cache structure comprises a tagged cache structure, each combiner cache entry having an associated tag value indicative of at least a portion of the address indication.

5. The prediction circuitry according to claim 1, in which the combiner cache structure comprises a set-associative cache structure capable of reading, in a single lookup cycle using a single read port, a set of two or more combiner cache entries associated with different address indications.

6. The prediction circuitry according to claim 1, in which, in response to resolution of an actual outcome associated with a prediction for a previous prediction input address, the combiner circuitry is configured to:
  update combiner prediction state information associated with the previous prediction input address; and
  update a corresponding combiner cache entry of the combiner cache structure corresponding to the previous prediction input address, based on an updated combined prediction determined by applying the prediction combination function to the updated combiner prediction state information associated with the previous prediction input address.

7. The prediction circuitry according to claim 6, in which the update to the corresponding combiner cache entry comprises updating at least a target item of combined prediction information selected based on a specific combination of values of the respective sets of prediction information generated by the plurality of predictors corresponding to the previous prediction input address.

8. The prediction circuitry according to claim 6, in which the update to the corresponding combiner cache entry comprises updating at least two items of combined prediction information of the corresponding combiner cache entry, based on applying the prediction combination function to the previous prediction input address and at least two different combinations of values for the respective sets of prediction information.

9. The prediction circuitry according to claim 6, in which in response to determining, when the update of the corresponding cache entry of the combiner cache structure based on the updated combiner prediction state information would require allocation of a new combiner cache entry to the combiner cache structure, that each valid item of combined prediction information to be specified in the new combiner cache entry based on the updated combined prediction satisfies a redundant allocation condition, the combiner circuitry is configured to suppress allocation of the new combiner cache entry to the combiner cache structure;
  wherein a given item of combined prediction information, for which selection of the given item of combined prediction information as the selected item of combined prediction information would depend on first prediction information generated by a first predictor of the plurality of predictors corresponding to a given prediction outcome, satisfies the redundant allocation condition when the updated combined prediction to be specified in the given item of combined prediction information specifies the same prediction outcome as the given prediction outcome.

10. The prediction circuitry according to claim 1, in which, in response to the combiner cache lookup circuitry detecting a miss in the combiner cache structure for the prediction input address, the combiner cache lookup circuitry is configured to generate the prediction for controlling the speculative action based on a prediction made by a first predictor of the plurality of predictors, independent of a prediction made by one or more other predictors of the plurality of predictors.

11. The prediction circuitry according to claim 1, in which the given combiner cache entry comprises a plurality of valid indications indicative of validity of the plurality of items of combined prediction information respectively, and the combiner cache lookup circuitry is configured to treat the prediction input address as missing in the combiner cache structure in response to determining that the combiner cache structure includes the selected combiner cache entry for which the address indication corresponds to the prediction input address but the selected item of combined prediction information is indicated as invalid by a corresponding one of the valid indications.

12. The prediction circuitry according to claim 1, in which the combiner cache lookup circuitry is configured to initiate a lookup of the combiner cache structure based on the prediction input address before a set of prediction information corresponding to the prediction input address becomes available from at least one of the plurality of predictors.

13. The prediction circuitry according to claim 1, in which the combined prediction selection circuitry is configured to select a subset of the items of combined prediction information of the selected combiner cache entry based on first prediction information generated corresponding to the prediction input address by a first predictor of the plurality of predictors, before second prediction information corresponding to the prediction input address becomes available from a second predictor of the plurality of predictors.

14. The prediction circuitry according to claim 1, in which a second predictor of the plurality of predictors is configured to generate second prediction information based on a lookup of a second predictor structure based on local history information tracking history for a specific subset of addresses including the prediction target address; and
a first predictor of the plurality of predictors is configured to generate first prediction information based on a lookup of a first predictor structure independent of the local history information.

15. The prediction circuitry according to claim 1, in which a first predictor of the plurality of predictors comprises a first TAGE (tagged-geometric) predictor comprising a first set of tagged-geometric tables looked up based on different lengths of first history information; and
a second predictor of the plurality of predictors comprises a second TAGE predictor comprising a second set of tagged-geometric tables looked up based on different lengths of second history information.

16. The prediction circuitry according to claim 1, in which the prediction comprises a branch prediction.

17. A system comprising:
the prediction circuitry of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A non-transitory computer-readable medium to store computer-readable code for fabrication of prediction circuitry to generate a prediction associated with a prediction input address for controlling a speculative action by a processor, the prediction circuitry comprising:
combiner circuitry to determine a combined prediction by applying a prediction combination function to a given address and respective sets of prediction information generated by a plurality of predictors corresponding to the given address;
a combiner cache structure comprising a plurality of combiner cache entries, where a given combiner cache entry is associated with an address indication and is indicative of a plurality of items of combined prediction information determined by the combiner circuitry for an address corresponding to the address indication and a plurality of different combinations of possible values for the respective sets of prediction information generated by the plurality of predictors; and
combiner cache lookup circuitry to look up the combiner cache structure based on the prediction input address to identify a selected combiner cache entry for which the address indication corresponds to the prediction input address, and to generate the prediction for controlling the speculative action based on a selected item of combined prediction information selected from the selected combiner cache entry based on the respective sets of prediction information generated by the plurality of predictors corresponding to the prediction input address.

20. A method for generating a prediction associated with a prediction input address for controlling a speculative action by a processor, the method comprising:
looking up a combiner cache structure based on the prediction input address, the combiner cache structure comprising a plurality of combiner cache entries, where a given combiner cache entry is associated with an address indication and is indicative of a plurality of items of combined prediction information determined by combiner circuitry applying a prediction combination function to a given address corresponding to the address indication and a plurality of different combinations of possible values for respective sets of prediction information generated by a plurality of predictors corresponding to the given address;
based on the lookup, identifying a selected combiner cache entry for which the address indication corresponds to the prediction input address; and
generating the prediction for controlling the speculative action based on a selected item of combined prediction information selected from the selected combiner cache entry based on the respective sets of prediction information generated by the plurality of predictors corresponding to the prediction input address.

* * * * *